United States Patent
Ishii et al.

(10) Patent No.: US 7,135,509 B2
(45) Date of Patent: Nov. 14, 2006

(54) FLAME-RETARDANT POLYBUTYLENE TEREPHTHALATE RESIN COMPOSITION AND FORMED ARTICLE

(75) Inventors: Hiromitsu Ishii, Nagoya (JP); Takashi Nagao, Nagoya (JP); Jiro Kumaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/528,632

(22) PCT Filed: Sep. 25, 2002

(86) PCT No.: PCT/JP02/09852

§ 371 (c)(1),
(2), (4) Date: Mar. 22, 2005

(87) PCT Pub. No.: WO2004/029154

PCT Pub. Date: Apr. 8, 2004

(65) Prior Publication Data

US 2006/0142438 A1   Jun. 29, 2006

(51) Int. Cl.
*C08K 5/3492* (2006.01)
*C08K 3/22* (2006.01)
*C08K 3/26* (2006.01)

(52) U.S. Cl. ............... 524/101; 524/127; 524/140; 524/141; 524/145; 524/425; 524/436

(58) Field of Classification Search ............ 524/101, 524/127, 140–141, 145, 425, 436
See application file for complete search history.

(56) References Cited

U.S. PATENT DOCUMENTS

| | | | | |
|---|---|---|---|---|
| 5,684,071 A | * | 11/1997 | Mogami et al. | 524/100 |
| 5,770,644 A | * | 6/1998 | Yamamoto et al. | 524/120 |
| 6,531,530 B1 | * | 3/2003 | Asano | 524/414 |
| 6,538,054 B1 | * | 3/2003 | Klatt et al. | 524/101 |

FOREIGN PATENT DOCUMENTS

| | | |
|---|---|---|
| JP | 51-150553 | 12/1976 |
| JP | 58-108248 | 6/1983 |
| JP | 59-81351 | 5/1984 |
| JP | 3-281652 | 12/1991 |
| JP | 5-70671 | 3/1993 |
| JP | 5-78560 | 3/1993 |
| JP | 5-287119 | 11/1993 |
| JP | 5-295164 | 11/1993 |
| JP | 5-320486 | 12/1993 |
| JP | 5-339417 | 12/1993 |
| JP | 6-220124 | 8/1994 |
| JP | 6-256417 | 9/1994 |
| JP | 7-233311 | 9/1995 |
| JP | 8-73713 | 3/1996 |
| JP | 10-77396 | 3/1998 |
| JP | 10-120881 | 5/1998 |
| JP | 10-147699 | 6/1998 |
| JP | 10-182955 | 7/1998 |
| JP | 10-182956 | 7/1998 |
| JP | 2000-26710 | 1/2000 |
| JP | 2000-212412 | 8/2000 |
| JP | 2001-49096 | 2/2001 |

* cited by examiner

*Primary Examiner*—Peter Szekely
(74) *Attorney, Agent, or Firm*—DLA Piper US LLP

(57) ABSTRACT

A flame-retardant polybutylene terephthalate resin composition wherein (A) 20-70% by weight of a polybutylene terephthalate resin or a mixture of a polybutylene terephthalate resin and a polyethylene terephthalate resin, (B) 1–20% by weight of a vinyl based resin, (C) 1–20% by weight of a phosphoric acid ester, (D) 1–30% by weight of a salt of a triazine based compound and cyanuric acid or isocyanuric acid, and (E) 0.1–5% by weight of an alkaline earth metal compound are compounded, and formed articles thereof have high degrees of flame retardancy and tracking resistance, and are unlikely to allow occurrence of metal pollution or deterioration in hydrolysis resistance due to a phosphoric acid ester, and therefore are suitable for machine component parts, electrical/electronic component parts, and automotive component parts.

12 Claims, No Drawings

FLAME-RETARDANT POLYBUTYLENE TEREPHTHALATE RESIN COMPOSITION AND FORMED ARTICLE

TECHNICAL FIELD

The present invention relates to flame-retardant resin composition and formed article wherein a non-halogenated flame retardant is compounded with a polybutylene terephthalate resin. More particularly, the invention relates to flame-retardant polybutylene terephthalate resin composition and formed article which have high degree of flame retardancy, hydrolysis resistance and tracking resistance, and in which occurrence of metal pollution due to a phosphoric acid ester is unlikely, and which are suitable for machine mechanism component parts, electrical/electronic component parts or automotive component parts, and which employ a non-halogenated flame retardant.

TECHNICAL BACKGROUND

The polybutylene terephthalate resin (PBT) is utilized in a wide variety of fields, such as machine mechanism component parts, electrical/electronic component parts, automotive component parts, etc., making most of its excellence in characteristics, such as injection moldability, mechanical properties, etc.

As PBT is essentially combustible, PBTs are required to have safety against flames, that is, flame retardancy, and in many cases need to have such high degrees of flame retardancy as to indicate V-0 in the UL 94 standard, as well as balance of general chemical and physical properties, in order to use the PBTs as industrial materials such as machine mechanism component parts, electrical/electronic component parts, automotive component parts, etc.

The method for imparting flame retardancy to the PBT is generally a method in which a halogenated organic compound as a flame retardant and an antimony compound as a flame retarding assistant are compounded into a resin. However, this method has a tendency toward large amounts of smoke produced during combustion.

Furthermore, with a rise of environment consciousness, there are movements having concerns about the influences of halogenated flame-retardant materials on the environments.

Therefore, recently, use of a flame retardant that contains none of such halogens has become desired.

As a method for flame-retarding a thermoplastic resin without using a halogenated flame retardant, addition of a hydrated metallic compound, such as aluminum hydroxide, magnesium hydroxide, etc., has been widely known. However, the aforementioned hydrated metallic compound needs to be added in a large amount in order to attain sufficient flame retardancy, and this method has a drawback of losing an essential property of resin.

As a method for flame-retarding a thermoplastic resin without using such a hydrated metallic compound, addition of red phosphorus is disclosed in Japanese Patent Application Laid-Open Publication No. SHO 51-150553, Japanese Patent Application Laid-Open Publication No. SHO 58-108248, Japanese Patent Application Laid-Open Publication No. SHO 59-81351, Japanese Patent Application Laid-Open Publication No. HEI 5-78560, Japanese Patent Application Laid-Open Publication No. HEI 5-287119, Japanese Patent Application Laid-Open Publication No. HEI 5-295164, Japanese Patent Application Laid-Open Publication No. HEI 5-320486, Japanese Patent Application Laid-Open Publication No. HEI 5-339417, etc.

These are useful flame-retardant resin materials not employing a halogenated flame retardant, but have peculiar coloration so that the color tone of the products is limited, and therefore has the challenge of limited uses.

Furthermore, in Japanese Patent Application Laid-Open Publication No. HEI 3-281652, Japanese Patent Application Laid-Open Publication No. HEI 5-70671, Japanese Patent Application Laid-Open Publication No. HEI 7-233311, Japanese Patent Application Laid-Open Publication No. HEI 8-73713 and Japanese Patent Application Laid-Open Publication No. HEI 10-120881, compounding an aromatic phosphoric acid ester and melamine cyanurate is disclosed.

Theses are useful flame-retardant resin materials not employing a halogenated flame retardant, but have a problem of occurrence of a bleedout in which an aromatic phosphoric acid ester seeps out to a formed article surface or of bringing about metal pollution.

Furthermore, in Japanese Patent Application Laid-Open Publication No. HEI 10-77396, Japanese Patent Application Laid-Open Publication No. HEI 10-147699, Japanese Patent Application Laid-Open Publication No. HEI 10-182955, Japanese Patent Application Laid-Open Publication No. HEI 10-182956, and Japanese Patent Application Laid-Open Publication No. 2000-26710, compounding a styrene based resin into a composition in which a resin, such as a PBT, a polyphenylene ether, etc., and a phosphoric acid ester are compounded is disclosed.

These are useful flame-retardant resin materials not employing a halogenated flame retardant, but have problems; for example, due to the compounding of such a resin as a polyphenylene ether, etc., the mechanical strength deteriorates, the fluidity at the time of injection molding deteriorates, the formed article colors yellow, and the hydrolysis resistance and the metal pollution characteristic are poor, and the uses are limited.

Furthermore, in Japanese Patent Application Laid-Open Publication No. HEI 2000-212412, compounding a polyester, and an organic phosphorus based flame retardant including a phosphoric acid ester, as well as a glass fiber, and a vinyl based resin is disclosed.

These are useful flame-retardant resin materials not employing a halogenated flame retardant, but have the challenge of metal pollution characteristic and deterioration in hydrolysis resistance due to the organic phosphorus based flame retardant.

Furthermore, in Japanese Patent Application Laid-Open Publication No. HEI 2001-49096, compounding a flame retardant composed of a phosphorus-containing compound including a phosphoric acid ester, and specific aromatic resin, aromatic nylon, polycarbonate resin, polyalylate resin, polyepoxy resin and polyphenylene ether resin into a resin component including a polyester based resin and a styrene based resin.

The aforementioned resin component including a polyester based resin and a styrene based resin is a resin component useful for improvement in moldability related to warpage, etc., and the aforementioned flame retardant is a useful flame retardant not employing a halogenated flame retardant, but does not have effect on the challenge of the metal pollution characteristic and deterioration in hydrolyzability due to the phosphorus-containing compound.

From what is described above, although the organic phosphorus based flame retardant, such as a phosphoric acid ester, etc., is a useful flame retardant as a method for flame-retarding the PBT by a non-halogenated flame retardant, a flame-retardant PBT resin composition that does not cause the metal pollution and the deterioration in hydrolysis resistance due to a phosphoric acid ester has been desired.

Particularly, formed articles for fusers of printers and copiers, flyback transformers, focus cases, electromagnetic switches, and breakers are often required to have excellent performance in relation to metal pollution, hydrolysis resistance and flame retardancy.

Furthermore, a phenomenon in which if voltage is applied to a formed article, etc., carbonization of the formed article progresses and results in ignition is termed tracking. Many formed articles of the PBT are used under high voltage modification. For example, as for the aforementioned formed articles for fusers of printers and copiers, electromagnetic switches, and breakers, etc., formed articles having excellent flame retardancy and a relative tracking index of 400V or higher, and preferably 600V or higher, are desired.

It would therefore be advantageous to attain highly reliable flame-retardant polybutylene terephthalate resin composition and formed article in which a non-halogenated flame retardant is compounded with a polybutylene terephthalate resin, and which have high degrees of flame retardancy and tracking resistance, and which are unlikely to allow occurrence of metal pollution or deterioration in hydrolysis due to a phosphoric acid ester.

SUMMARY OF THE INVENTION

A flame-retardant polybutylene terephthalate resin composition is provided wherein (A) 20–70% by weight of a polybutylene terephthalate resin or a mixture of a polybutylene terephthalate resin and a polyethylene terephthalate resin, (B) 1–20% by weight of a vinyl based resin, (C) 1–20% by weight of a phosphoric acid ester, (D) 1–30% by weight of a salt of a triazine based compound and cyanuric acid or isocyanuric acid, and (E) 0.1–5% by weight of an alkaline earth metal compound are compounded, and formed articles made of the flame-retardant polybutylene terephthalate resin composition so as to be used as machine mechanism component parts, electrical/electronic component parts or automotive component parts.

DETAILED DESCRIPTION

The (A) polybutylene terephthalate resin is a polymer obtained by a polycondensation reaction of terephthalic acid or its ester-forming derivative and 1,4-butanediol or its ester-forming derivative; besides, isophthalic acid, naphthalenedicarboxylic acid, adipic acid, sebacic acid, dodecanedioic acid, oxalic acid, etc., as an acid component, and ethylene glycol, propylene glycol, neopentyl glycol, 1,5-pentanediol, 1,6-hexanediol, decamethylene glycol, cyclohexanedimethanol, cyclohexanediol, etc., or a long chain glycol having a molecular weight of 400–6000, namely, polyethylene glycol, poly-1,3-propylene glycol, polytetramethylene glycol, etc., as a glycol component, may be copolymerized at 20 mol % or less. As preferable examples of the polymer or copolymer, polybutylene terephthalate, polybutylene(terephthalate/isophthalate), polybutylene(terephthalate/adipate), polybutylene(terephthalate/sebacate), polybutylene(terephthalate/decanedicarboxylate), polybutylene (terephthalate/naphthalate), etc., may be cited, which may be used singly or used in a mixture of two or more species thereof. Incidentally, "/" herein means copolymerization.

Furthermore, as for the polymer or copolymer, the ones whose intrinsic viscosity measured at 25° C. by using an o-chlorophenol solvent is within the range of 0.36–1.60 and particularly of 0.42–1.25 is preferred in view of the impact strength and moldability of the resultant compositions. Furthermore, as for the (A) polybutylene terephthalate resin, poly-butylene terephthalate resins different in intrinsic viscosity may be used together. It is preferable to use polybutylene terephthalate resins whose intrinsic viscosity is within the range of 0.36–1.60.

Still further, as for such polybutylene terephthalate resins, the ones whose COOH terminal group amount determined by potentiometric titration of an m-cresol solution with an alkali solution is within the range of 1–50 eq/t (terminal group amount in 1 ton of polymer) are preferably used in view of durability. In particular, the ones whose COOH terminal group amount is 45 eq/t or less, and more preferably 30 eq/t or less, and more preferably 20 eq/t or less are preferably used since they are excellent in hydrolysis resistance.

Furthermore, the polyethylene terephthalate resin of the mixture of the poly-ethylene terephthalate resin and the polybutylene terephthalate resin component of the (A) component in the present invention refers to a high-molecular weight thermoplastic polyester resin in which a main chain formed through a polycondensation using terephthalic acid as an acid component and ethylene glycol as a glycol component has ester linkages; besides, isophthalic acid, adipic acid, oxalic acid, etc., as an acid component, and propylene glycol, 1,4-butanediol, neopentyl glycol, 1,5-pentanediol, 1,6-hexanediol, decamethylene glycol, cyclohexanedimethanol, cyclohexanediol, etc., or a long chain glycol having a molecular weight of 400–6000, namely, polyethylene glycol, poly-1,3-propylene glycol, polytetramethylene glycol, etc., as a glycol component, may be copolymerized at 20 mol % or less. Furthermore, as for the polyethylene terephthalate resin, the ones whose intrinsic viscosity measured at 25° C. by using an o-chlorophenol solvent is within the range of 0.36–1.60 and particularly of 0.45–1.15 is preferred in view of the impact strength and moldability of the resultant compositions.

Furthermore, with regard to the mixing proportion with the polybutylene terephthalate resin that forms the (A) component, the polybutylene terephthalate resin is at 5–95% by weight and the polyethylene terephthalate resin is at 95–5% by weight in view of flame retardancy and crystallinity; more preferably, the polybutylene terephthalate resin is at 25–75% by weight and the polyethylene terephthalate resin is at 75–25% by weight.

Furthermore, the compounding amount of the polybutylene terephthalate resin or the mixture of a polybutylene terephthalate resin and a polyethylene terephthalate resin that forms the (A) component is 20–70% by weight, more preferably 20–65% by weight, and particularly preferably 25–60% by weight.

Furthermore, one or more species of polyester resins, such as a polyalylate resin, a full aromatic liquid crystal polyester, a semi-aromatic liquid crystal polyester, a polycyclohexandimethylene terephthalate resin, etc., may be compounded with the (A) component, and the compounding amount thereof is an amount within such a range that the effects are not considerably reduced.

As the (B) vinyl based resin, a resin made by polymerizing one or more species of monomers selected from aromatic vinyl compounds, vinyl cyanide compounds, (meth)acrylic acid alkyl esters and maleimide based monomers, or a one made by graft-polymerizing or copolymerizing such monomers with a rubber based component, such as a polybutadiene based rubber, etc., etc., may be cited (hereinafter, these resins will sometimes be collectively referred to as "(co)polymer") although the (B) vinyl based resin is not limited thereto.

As the aforementioned aromatic vinyl compound, styrene, α-methyl styrene, vinyltoluene, divinyl benzene, etc., may be cited. As the vinyl cyanide compound, acrylonitrile, methacrylonitrile, etc., may be cited. As the (meth)acrylic acid alkyl ester, (meth)acrylic acid alkyl esters, such as methyl methacrylate, ethyl methacrylate, n-butyl methacrylate, methyl acrylate, ethyl acrylate, n-butyl acrylate, stearyl acrylate, etc. may be cited. As the maleimide based monomer, maleimide, N-substituted maleimides, such as N-methyl maleimide, N-ethyl maleimide, N-phenyl maleimide, N-cyclohexyl maleimide as well as their derivatives, etc., etc., may be cited. Furthermore, vinyl based resins with a below-mentioned component being copolymerizable with the aforementioned vinyl based resin are also included in the present invention. As specific examples of the aforementioned copolymerizable component, diene compounds, maleic acid dialkyl esters, allyl alkyl ethers, unsaturated amino compounds, vinyl alkyl ethers, etc., may be cited.

As examples of preferable (co)polymers of the (B) vinyl based resin, vinyl based (co)polymers, such as polymethyl methacrylate resins, methyl methacrylate/acrylonitrile resins, polystyrene resins, acrylonitrile/styrene resins (AS resins), styrene/butadiene resins, styrene/N-phenyl maleimide resins, styrene/acrylonitrile/N-phenyl maleimide resins, etc., styrene based resins modified by gum polymers, such as acrylonitrile/butadiene/styrene resins (ABS resins), acrylonitrile/butadiene/methyl methacrylate/styrene resins (MABS resins), high-impact polystyrene resins, etc., and styrene/butadiene/styrene resins, styrene/isoprene/styrene resins, styrene/ethylene/butadiene/styrene resins, etc., as block copolymers, may be cited. In particular, polystyrene resins and acrylonitrile/styrene resins are preferable. Furthermore, acrylonitrile/styrene copolymer, which is a copolymer made by copolymerizing acrylonitrile and styrene, are more preferable (/indicates copolymerization).

Furthermore, as for the acrylonitrile/styrene copolymer, acrylonitrile/styrene copolymers containing acrylonitrile at 10 wt. % or greater and less than 50 wt. % are particularly preferable. More preferably, the content of acrylonitrile is 20 wt. % or greater and less than 40 wt. %. If the content of acrylonitrile is within an appropriate range, the employment thereof together with an alkali metal compound achieves particularly increased effects of enhancing hydrolysis resistance and improving metal pollution characteristic.

Furthermore, an acrylonitrile/styrene copolymer containing acrylonitrile at 10 wt. % or greater and less than 50 wt. % may be copolymerized with other copolymerizable monomers within such a range that the effects will not be impaired. As the copolymerizable monomers, aromatic vinyl compounds, (meth)acrylic acid alkyl esters, maleimide based monomers, etc., may be cited; specifically, the foregoing compounds may be cited.

Furthermore, the vinyl based resin may be a vinyl based copolymer in which unsaturated monocarboxylic acids and the like, unsaturated dicarboxylic acids and the like, unsaturated acid anhydrides, or epoxy group-containing vinyl based monomers are graft-polymerized or copolymerized.

In particular, the copolymer is preferably a vinyl based copolymer in which unsaturated acid anhydrides or epoxy group-containing vinyl based monomers are graft-polymerized or copolymerized.

The epoxy group-containing vinyl based monomers as mentioned above are compounds that have in one molecule both an epoxy group and a vinyl group capable of radical polymerization. As specific examples thereof, glycidyl esters and the like of unsaturated organic acids, such as glycidyl acrylate, glycidyl methacrylate, glycidyl ethacrylate, glycidyl itaconate, etc., glycidyl ethers and the like, such as allyl glycidyl ethers, etc., and derivatives and the like of the aforementioned monomers, such as 2-methyl glycidyl methacrylate, etc., may be cited. In particular, glycidyl acrylate and glycidyl methacrylate may be preferably used. These may also be used singly or in a combination or two or more species.

Furthermore, the unsaturated acid anhydrides and the like are compounds having in one molecule both an acid anhydride and a vinyl group capable of radical polymerization. As specific examples thereof, maleic anhydride, etc. may be preferably cited.

As for the method for producing the vinyl based copolymer in which the aforementioned unsaturated monocarboxylic acids and the like, the unsaturated dicarboxylic acids and the like, the unsaturated acid anhydrides, or the epoxy group-containing vinyl based monomers are graft-polymerized or copolymerized, ordinarily known methods may be adopted. Particularly, a method in which an aromatic vinyl monomer (preferably, styrene), or an aromatic vinyl monomer (preferably, styrene) and another monomer copolymerizable with the foregoing monomer are copolymerized with an unsaturated monocarboxylic acid or the like, an unsaturated dicarboxylic acid or the like, an unsaturated acid anhydride, or an epoxy group-containing vinyl based monomer, a method in which the aforementioned (co)polymer is graft-polymerized with an unsaturated monocarboxylic acid or the like, an unsaturated dicarboxylic acid or the like, an unsaturated acid anhydride, or an epoxy group-containing vinyl based monomer may be cited. The copolymerization and graft polymerization as mentioned above may be carried out by known methods as well.

The amount of an unsaturated monocarboxylic acid or the like, an unsaturated dicarboxylic acid or the like, an unsaturated acid anhydride, or an epoxy group-containing vinyl based monomer used for the graft polymerization or the copolymerization is not particularly limited as long as it is effective in improving the compatibility between the (A) component and the vinyl based resin. However, it is preferable that the amount thereof be 0.05% by weight or greater with respect to the vinyl based resin. If a large amount thereof is copolymerized, there is a tendency toward fluidity deterioration or gelation. Therefore, the amount is preferably 20% by weight or less, more preferably 10% by weight or less, and more preferably 5% by weight or less.

Furthermore, the vinyl based (co)polymer may also be a vinyl based (co)polymer in which the (co)polymer mentioned above is epoxy-modified with an epoxidizing agent, such as a peroxide or the like, performic acid, peracetic acid, perbenzoic acid, etc. In this case, in order to effectively bring about the epoxy modification, it is preferable that the vinyl based resin be random-copolymerized or block-copolymerized with a diene based monomer. As for examples of the diene based monomer, butadiene, isoprene, etc., are preferably used. Examples of preferred production methods for the epoxy-modified vinyl based resins are indicated in Japanese Patent Application Laid-Open Publication No. HEI 6-256417, Japanese Patent Application Laid-Open Publication No. HEI 6-220124, etc. As preferable vinyl based resins, copolymers, such as styrene/butadiene resins, etc., ABS based resins, such as acrylonitrile/butadiene/styrene resins (ABS resins), acrylonitrile/butadiene/methyl methacrylate/styrene resins (MABS resins), etc., block copolymers, such as styrene/butadiene/styrene resins, styrene/butadiene resins, styrene/isoprene/styrene resins, styrene/ethylene/butadiene/styrene resins, etc., may be cited. Among these, block copolymers, such as styrene/butadiene/styrene resins, styrene/isoprene/styrene resins, styrene/ethylene/butadiene/styrene resins, etc., are preferably used.

Furthermore, the amount of the epoxy group introduced into the vinyl based resin in an epoxy group introduction method using an epoxidizing agent is not particularly limited as long as it is effective in improving the compatibility between the (A) component and the vinyl based resin. However, the epoxy equivalent thereof is preferably 100 g/equivalent or greater and 10000 g/equivalent or less, more preferably 200 or greater and 5000 g/equivalent or less, and more preferably 250 or greater and 3000 g/equivalent or less. The epoxy equivalents of the resins can be measured by a method described in Japanese Patent Application Laid-Open Publication No. HEI 6-256417.

Vinyl based resins in which epoxy group-containing vinyl based monomers are graft-polymerized or copolymerized, and block copolymers epoxy-modified by an epoxidizing agent, such as styrene/butadiene/styrene resins, styrene/isoprene/styrene resins, styrene/ethylene/butadiene/styrene resins, etc., are preferably used as due to good compatibility with the (A) component. Moreover, vinyl based resins in which glycidyl methacrylate is graft-polymerized or copolymerized are more preferably used. In particular, ones in which glycidyl methacrylate is copolymerized are preferable, and copolymers in which styrene, acrylonitrile and glycidyl methacrylate are copolymerized are particularly preferable. The preferable amount of glycidyl methacrylate copolymerized in the aforementioned copolymer in which styrene, acrylonitrile and glycidyl methacrylate are copolymerized is preferably an amount that is effective in improving the compatibility with the (A) component. It is preferable that the amount be 0.1% by weight or greater with respect to the copolymer. If a large amount thereof is copolymerized, there is a problem of fluidity deterioration or gelation. Therefore, the amount is preferably 20% by weight or less, more preferably 10% by weight or less, and more preferably 5% by weight or less. Furthermore, there are no particular restrictions on the amounts of styrene and acrylonitrile copolymerized. However, with respect to the total of styrene and acrylonitrile, acrylonitrile is preferably at 10% by weight or greater and 50% by weight or less, and more preferably at 20% by weight or greater and 40% by weight or less.

Furthermore, as a preferable one of the (B) vinyl based resin, a multilayer structure made up of an innermost layer (core layer) and an outer layer (shell layer) covering the innermost layer wherein the outer layer (shell layer) is composed of a vinyl based resin may be cited. This multilayer structure is a polymer having a structure that is generally termed core-shell form and that is formed by an innermost layer (core layer) and one or more species of outer layers (shell layers) covering the innermost layer, wherein the (B) vinyl based resin is formed as a species of the outer layers (shell layers), and contiguous layers are composed of different species of polymers.

The number of layers that compose the multilayer structure is not particularly limited. It is appropriate that the number of layers be 2 or greater. The number of layers may also be 3 or greater, or 4 or greater.

Furthermore, the multilayer structure is preferably a multilayer structure having therein at least one rubber layer.

In the multilayer structure, the kind of the rubber layer is not particularly limited, but it is appropriate that the rubber layer be composed of a polymer component having rubber elasticity. For example, rubbers composed of polymerized products of an acryl component, a silicone component, a styrene component, a nitrile component, a conjugated diene component, a urethane component, an ethylene propylene component, etc. may be cited. Preferable rubbers, for example, are rubbers composed of polymerized products of acryl components, such as ethyl acrylate units, butyl acrylate units, etc., silicone components, such as dimethylsiloxane unit, phenylmethylsiloxane units, etc., styrene components, such as styrene units, α-methyl styrene units, etc., nitrile components, such as acrylonitrile units, methacrylonitrile units, etc., and conjugated diene components, such as butanediene units, isoprene units, etc. Furthermore, rubbers composed of copolymerized products of combinations of two or more species of these components are also preferable. For example, (1) rubbers composed of components in which acryl components, such as ethyl acrylate units, butyl acrylate units, etc., and silicone components, such as dimethylsiloxane units, phenyl-methylsiloxane units, etc., are copolymerized, (2) rubbers composed of components in which acryl components, such as ethyl acrylate units, butyl acrylate units, etc., and styrene components, such as styrene units, α-methyl styrene units, etc., are copolymerized, (3) rubbers composed of components in which acryl components, such as ethyl acrylate units, butyl acrylate units, etc., and conjugated diene components, such as butanediene units, isoprene units, etc., are compounded, and (4) rubbers composed of components in which acryl components, such as ethyl acrylate units, butyl acrylate units, etc., silicone components, such as dimethylsiloxane units, phenylmehtylsioxane units, etc., and styrene components, such as styrene units, α-methyl styrene units, etc., are copolymerized, etc. may be cited. Furthermore, besides the aforementioned components, rubbers in which crosslinkable components, such as divinylbenzene units, allyl acrylate units, butylene glycol diacrylate units, etc., are copolymerized and crosslinked are also preferable.

In the multilayer structure, the core layer is composed of a vinyl based resin, and is preferably a polymer component having a higher glass transition temperature than the rubber layer. As a vinyl based resin that composes the core layer, polymers containing at least a vinyl based resin of one or more species of units selected from an unsaturated carboxylic acid alkyl ester based unit, an unsaturated glycidyl group-containing unit, an unsaturated dicarboxylic anhydride based unit, an aliphatic vinyl based unit, an aromatic vinyl based unit, a vinyl cyanide based unit, a maleimide based unit, an unsaturated dicarboxylic acid based unit, and other vinyl based units, etc., may be cited. In particular, polymers containing at least one species of units selected from the aliphatic vinyl based unit, the unsaturated carboxylic acid alkyl ester based unit, the unsaturated glycidyl group-containing unit, and the unsaturated dicarboxylic anhydride based unit are preferable.

Although the unsaturated carboxylic acid alkyl ester based unit is not particularly limited, (meth)acrylic acid alkyl esters are preferably used. Specifically, methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, stearyl (meth)acrylate, octadecyl (meth)acrylate, phenyl (meth)acrylate, benzyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, aminoethyl acrylate, propylaminoethyl acrylate, dimethylaminoethyl methacrylate, ethyl aminopropyl methacrylate, phenylaminoethyl methacrylate, cyclohexylaminoethyl methacrylate, etc., may be cited, and methyl (meth)acrylate is preferably used. These units may be used singly or two or more species thereof may be used together.

Furthermore, the aforementioned unsaturated glycidyl group-containing unit is not particularly limited, and glycidyl (meth)acrylate, glycidyl itaconate, diglycidyl itaconate, allyl glycidyl ether, styrene-4-glycidyl ether, 4-glycidyl styrene, etc., may be cited. In view of the great effect of improving the impact resistance, glycidyl (meth)acrylate is preferably used. These units may be used singly or two or more species thereof may be used.

Furthermore, as the aforementioned unsaturated dicarboxylic anhydride based unit, maleic anhydride, itaconic anhydride, glutaconic anhydride, trimellitic anhydride, pyromellitic anhydride, etc., may be cited. In view of the great effect of improving the impact resistance, maleic anhydride is preferably used. These units may be used singly or two or more species thereof may be used.

Furthermore, as the aforementioned aromatic vinyl based unit, styrene, α-methyl styrene, 1-vinylnaphthalene, 4-methyl styrene, 4-propylstyrene, 4-cyclohexylstyrene, 4-dodecylstyrene, 2-ethyl-4-benzylstyrene, 4-(phenylbutyl)styrene, etc. may be cited. As the aforementioend vinyl cyanide based unit, acrylonitrile, methacrylonitrile, ethacrylonitrile, etc. may be cited. As the aformentioned maleimide based unit, maleimide, N-methyl maleimide, N-ethyl maleimide, N-propylmaleimide, N-isopropylmaleimide, N-cyclohexylmaleimide, N-phenyl maleimide, etc. may be cited. As the aformentioned unsaturated dicarboxylic acid based unit, maleic acid, maleic acid monoethyl ester, itaconic acid, phthalic acid, etc. may be cited. As the aforementioned other vinyl based units, acrylamide, methacrylamide, N-methylacrylamide, butoxymethylacrylamide, N-propylmethacrylamide, N-vinyl diethylamine, N-acetylvinylamine, allylamine, methallyamine, N-methylallylamine, p-aminostyrene, 2-isoproperty-oxazoline, 2-vinyl-oxazoline, 2-acroyl-oxazoline, 2-styryl-oxazoline, etc. may be cited. These units may be used singly or two or more species thereof may be used together. Acrylonitrile/styrene copolymers made up of aromatic vinyl based units and vinyl based units are preferably used.

Furthermore, as preferable examples of the multilayer structure, ones in which the core layer is of a dimethylsiloxane/butyl acrylate polymer and the outermost layer is of a methyl methacrylate or an acrylonitrile/styrene copolymer, ones in which the core layer is of a butanediene/styrene polymer and the outermost layer is of a methyl methacrylate polymer or an acrylonitrile/styrene copolymer, ones in which the core layer is of a butyl acrylate polymer and the outermost layer is of a methyl methacrylate polymer or an acrylonitrile/styrene copolymer, etc. may be cited. Still further, it is more preferable that one or both of the rubber layer and the outermost layer be of a polymer containing glycidyl methacrylate units.

Furthermore, the particle diameter of the multilayer structure is not particularly limited, but it is preferable that the particle diameter thereof be 0.01 μm or greater and 1000 μm or less, and furthermore, it is more preferable that it be 0.02 μm or greater and 100 μm or less, and particularly, it is most preferable that it be 0.05 μm or greater and 10 μm or less.

Furthermore, the weight ratio between the core and shell in the multilayer structure is not particularly limited, but it is preferable that the core layer be at 10% by weight or greater and 90% by weight or less with respect to the entire multilayer structure, and it is more preferable that it be 30% by weight or greater and 80% by weight or less.

Furthermore, as for the multilayer structure, a commercially sold item that meets the foregoing conditions may be used, or a multilayer structure may be prepared by a known method so as to be used.

Furthermore, as for the commercially sold items of the multilayer structure, "Metablen" produced by Mitsubishi Rayon Co., "Kane Ace" produced by Kanegafuchi Kagaku Kogyo Co., "Paraloid" produced by Kureha Chemical Industry Co., "Acryloid" by Rohm & Haas Co., "Staphyloid" produced by Takeda Pharmaceutical Co., "Parapet SA" produced by Kuraray Co., etc. may be cited. These may be used singly or two or more species thereof may be used together.

Furthermore, the compounding amount of the (B) vinyl based resin may be 1–20% by weight, more preferably 2–18% by weight, and particularly preferably 2–15% by weight in view of the flame retardancy, the contact contamination characteristic improving effect, and the hydrolysis resistance enhancing effect of the resultant flame-retardant resin composition caused by the combined use with other components.

The (C) phosphoric acid ester is not particularly limited, but generally commercially sold items or synthesized phosphoric acid esters may be used. As specific examples, tricresyl phosphate, trixylenyl phosphate, cresyldiphenyl phosphate, triphenyl phosphate, tris-isopropylbiphenyl phosphate, trimethyl phosphate, triethyl phosphate, tributyl phosphate, trioctyl phosphate, tributoxyethyl phosphate, octyldiphenyl phosphate, orthophenyl phenol based phosphoric acid ester, pentaerythritol based phosphoric acid ester, neopentylglycol based phosphoric acid ester, substituted neopentylglycol phosphonate, nitrogenated based phosphoric acid ester, the aromatic phosphoric acid esters of the following expression (1), etc. may be cited. Particularly, the aromatic phosphoric acid esters of the following expression (1) are preferably used.

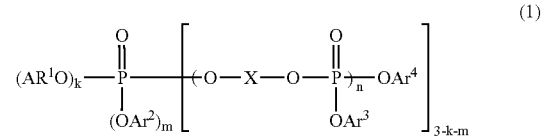

(1)

(In the above expression, $Ar^1$, $Ar^2$, $Ar^3$ and $Ar^4$ represent the same or different aromatic groups that do not contain a halogen. Furthermore, X represents a structure selected from the following expressions (2)–(4). In the following expressions (2)–(4), $R^1$–$R^8$ represent the same or different hydrogen atoms or alkyl groups having carbon numbers of 1–5, Y represents a direct coupling, O, S, $SO_2$, $C(CH_3)_2$, $CH_2$, CHPh, and Ph represents a phenyl group. Furthermore, n in the (1) expression is an integer of 0 greater. Furthermore, k, m in the (1) expression are each an integer of 0 or greater and 2 or less, and (k+m) is an integer of 0 or greater and 2 or less.) Incidentally, the aromatic phosphoric acid ester may be a mixture of aromatic phosphoric acid esters having different integers n and different structures.

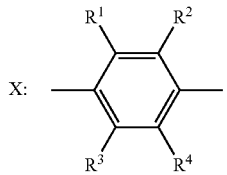

(2)

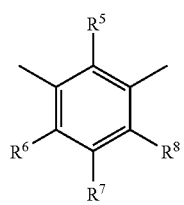

(3)

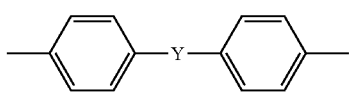

(4)

More specifically, n in the expression of the expression (1) is an integer of 0 or greater, and the upper limit thereof is preferably 40 or less in view of flame retardancy. The integer n is preferably 0–10, and particularly preferably 0–5.

Furthermore, k, m are each an integer of 0 or greater and equal 2 or less, and k+m is an integer of 0 or greater and 2 or less. Preferably, k, m are each an integer of 0 or greater and 1 or less, and more preferably, k, m are each 1.

Furthermore, in the expressions of the expressions (2)–(4), $R^1$–$R^8$ represent the same or different hydrogen atoms or alkyl groups having carbon numbers of 1–5. As specific examples of the alkyl groups having carbon numbers of 1–5, methyl group, ethyl group, n-propyl group, isopropyl group, n-butyl group, sec-butyl group, tert-butyl group, n-isopropyl, neopentyl, tert-pentyl group, 2-isopropyl, 3-isopropyl, neoisopropyl, etc. may be cited. Hydrogen, methyl group, and ethyl group are preferable, and hydrogen is particularly preferable.

le;2qFurthermore, $Ar^1$, $Ar^2$, $Ar^3$ and $Ar^4$ represent the same or different aromatic groups that do not contain a halogen. As the aromatic groups mentioned above, aromatic groups having a benzene skeleton, a naphthalene skeleton, an indene skeleton, an anthracene skeleton may be cited. In particular, ones having a benzene skeleton or a naphthalene skeleton are preferable. These may be substituted by an organic residue that does not have a halogen (preferably an organic residue having a carbon number of 1–8). The number of substituted groups is not particularly limited, but its preferable that the number thereof be 1–3. As specific examples, aromatic groups, such as phenyl group, tolyl group, xylyl group, cumenyl group, mesityl group, naphthyl group, indenyl group, anthryl group, etc., may be cited. Phenyl group, tolyl group, xylyl group, cumenyl group, and naphthyl group are preferable, and phenyl group, tolyl group, and xylyl group are particularly preferable.

In particular, the following compounds (6), (7) are preferable, and the (6) compound is particularly preferable.

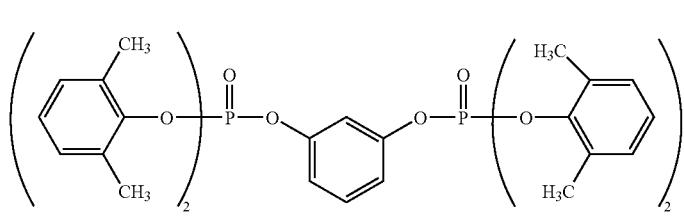

(6)

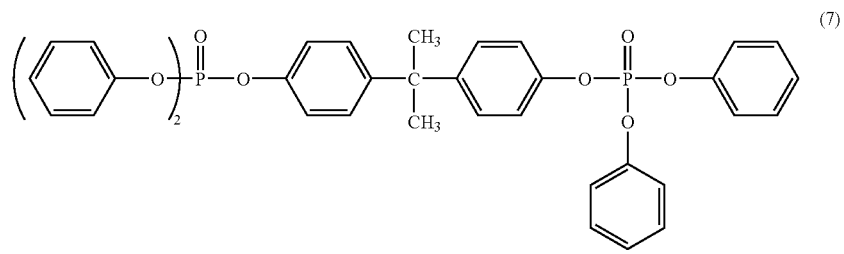

(7)

As for commercially sold phosphoric acid esters, one species or two or more species selected from PX-200, PX-201, PX-130, CR-733S, TPP, CR-741, CR747, TCP, TXP and CDP produced by Daihachi Kagaku Co. may be used, and preferably one species or two or more species selected from PX-200, TPP, CR-733S, CR-741 and CR747 may be used, and particularly preferably PX-200, CR-733S and CR-741 may be used. Among these, PX-200 is the most preferable because the effect of improving the hydrolysis resistance and the contact contamination characteristic is particularly great in the cases of combined use with a vinyl based resin and an alkaline earth metal compound.

Furthermore, the adding amount of the (C) phosphoric acid ester is 1–20% by weight, preferably 2–18% by weight, and more preferably 3–15% by weight in view of flame retardancy, hydrolysis resistance, and metal pollution.

As for the salt of the (D) triazine based compound with cyanuric acid or isocyanuric acid, the adduct between cyanuric acid or isocyanuric acid and a triazine based compound is preferable, and is an adduct having a composition of ordinarily 1-1 (molar ratio) and sometimes 1-2 (molar ratio). Of the triazine based compounds, ones that do not form a salt with cyanuric acid or isocyanuric acid are excluded. Furthermore, among the salts of the (D) triazine based compound and cyanuric acid or isocyanuric acid, salts of melamine, benzoguanamine, acetoguanamine, 2-amide-4,6-diamino-1,3,5-triazine, mono(hydroxymethyl)melamine, di(hydroxymethyl)melamine and tri(hydroxymethyl)melamine are preferable, and particularly salts of melamine, benzoguanamine and acetoguanamine are preferable. They are produced by known methods. For example, a mixture of a triazine based compound and cyanuric acid or isocyanuric acid is prepared as water slurry, and is thoroughly mixed so that the salt of the two substances is formed as fine particles, and then the slurry is filtered and dried, so that the salt is generally obtained in a powder form. Furthermore, the aforementioned salt does not need to be completely pure but small amounts of unreacted triazine based compound or cyanuric acid or isocyanuric acid may remain therein. Furthermore, the number average particle diameter of the salt prior to the compounding into the resin is preferably 100-0.01 µm, and more preferably 80-1 µm, in view of the flame retardancy, mechanical strength, moist heat resistance characteristic, residence stability, surface characteristic of the formed article. Furthermore, if the dispersion of the salt is poor, a dispersing agent, such as tris(β-hydroxy-ethyl)isocyanurate, etc., or a known surface treating agent, etc., may well be used together.

Furthermore, the compounding amounts of the salt of the (D) triazine based compound and cyanuric acid or isocyanuric acid is 1–30% by weight, preferably 2–25% by weight, and particularly preferably 3–20% by weight, in view of flame retardancy and mechanical characteristic.

As the alkaline earth metal in the (E) alkaline earth metal compound, magnesium, calcium, barium, etc., are preferably cited. Furthermore, as the alkaline earth metal compound, hydroxides, oxides, inorganic acid salts, such as carbonic acid salts, sulfuric acid salts, acetic acid salts, phosphoric acid salts, etc., and organic acid salts, such as acetic acid salts, lactic acid salts, oleic acid, palmitic acid, stearic acid, montanoic acid, etc. are preferable. As specific examples, magnesium hydroxide, calcium hydroxide, barium hydroxide, magnesium oxide, calcium oxide, barium oxide, magnesium carbonate, calcium carbonate, barium carbonate, magnesium sulfate, calcium sulfate, barium sulfate, magnesium phosphate, calcium phosphate, barium phosphate, magnesium acetate, calcium acetate, barium acetate, magnesium lactate, calcium lactate, barium lactate, and, furthermore, magnesium salts, calcium salts, barium salts, etc. of organic acids, such as oleic acid, palmitic acid, stearic acid, montanoic acid, etc., may be cited. Among these, hydroxides and carbonic acid salts of alkaline earth metals are preferably used. Particularly, magnesium hydroxide and calcium carbonate are preferably used, and more preferably, calcium carbonate is used. Such alkaline earth metals may be used in a fashion of one species or two or more species. Furthermore, as for the aforementioned calcium carbonate, cololide calcium carbonate, precipitated calcium carbonate, ground calcium carbonate, levigated fine powder ground calcium carbonate, wet ground calcium carbonate (chalk), etc., according to the production methods, are known, and each one of them is encompassed in the present invention.

These alkaline earth metal compounds may be treated with one or more species of surface treating agents, such as silane coupling agents, organic substances, inorganic substances, etc. The configuration thereof may be a powder form, a platy form, or a fibrous form. However, it is preferable to use the alkaline earth metal compound in the form of a powder of 10 µm or less in view of dispersibility, etc. If the particle diameter is even smaller, the effect of enhancing the hydrolysis resistance is great, and therefore smaller particle diameters are preferable.

By adding the (E) alkaline earth metal compound, the hydrolysis characteristic can be remarkably enhanced, due to the combined use with the (B) vinyl based resin. The phosphoric acid ester based compound effective as a non-halogenated flame retardant has a drawback of being inferior in hydrolysis resistance since the phosphoric acid ester linkage is easily hydrolyzable. By using the vinyl based resin and the alkaline earth metal compound in a combined use fashion, very high effect of enhancing hydrolysis resistance and improving metal pollution characteristic can be obtained. It is speculated that the very high effect is obtained due to the acid trap by the alkaline earth metal, and the prevention of elusion of the phosphoric acid ester by the addition of a vinyl compound having high affinity to the phosphoric acid ester.

It is generally known that the hydrolysis of polyesters is accelerated by an acid or an alkali serving as a catalyst. Alkali metal compounds have alkalinity in many cases, and accelerates the hydrolysis of polyesters in ordinary cases. Therefore, addition thereof is not preferable. Therefore, as for the alkaline earth metal compound, ones that are hardly soluble in water if in a neutral state, and that dissolves in an environment acidization and exhibits a neutralizing action if the phosphoric acid ester decomposes so that the system becomes acidic, are preferably used. The solubilities in the neutral state are described in various handbooks, for example, Chemical Handbook, published (1966) by Maruzen Kabushikigaisha, etc. The solubility in water is preferably 1 g/100 g water, more preferably $10^{-1}$ g/100 g water, and particularly preferably $10^{-2}$ g/100 g water. Incidentally, the solubility in water of calcium carbonate, which is most preferably used, is $5.2 \times 10^{-3}$ g/100 g water.

Furthermore, the compounding amount of the (E) alkaline earth metal compound is 0.1–5% by weight, preferably 0.2–4% by weight, and more preferably 0.3–3% by weight, in view of mechanical characteristic and hydrolysis resistance.

Furthermore, as for the compounding amount of the (E) alkaline earth metal compound, it is particularly preferable that the compounding ratio between the (C) phosphoric acid ester and the (E) alkaline earth metal compound be as in the following expression (5).

$$\frac{Wp}{M} \times Np \times 0.03 \leq \frac{Wa}{Ma} \times 2 \leq \frac{Wp}{M} \times Np \times 0.6 \qquad (5)$$

(In the above expression, Wp represents the compounding amount of the (C) phosphoric acid ester (% by weight), M represents the molecular weight of the (C) phosphoric acid ester, Np represents the number of phosphoric acid ester linkages of the phosphoric acid ester of (C), Wa represents the compounding amount of the (E) alkaline earth metal compound (% by weight), and Ma is the molecular weight of the (E) alkaline earth metal compound, and 2 in the expression indicates the valence of the alkaline earth metal.)

This expression indicates that it is preferable that the adding amount of the alkali metal compound be an empirically verified specific amount with respect to the adding amount of the phosphoric acid ester in order to enhance the hydrolysis resistance and the metal pollution characteristic. In the case where the adding amount of the alkaline earth metal compound is below this range, the improving effect is small. In the case where the adding mount is above the range, the hydrolysis resistance and the metal pollution characteristic are deteriorated. Therefore, both cases are not preferable.

The (F) epoxy compound may further be compounded. As the epoxy compound, glycidyl ester compounds, glycidyl ether compound and glycidyl ester ether compounds may be cited. These may be used in a fashion of one or more species.

Furthermore, in order to realize the exellent improving effect on the hydrolysis resistance of the PBT, an epoxy compound of less than 500 in epoxy equivalent is preferable, and furthermore an epoxy compound of less than 400 in epoxy equivalent is particularly preferable. The epoxy equivalent herein is an epoxy compound wherein the number of grams of the epoxy compound that contains 1 gram equivalent of epoxy group is less than 500. The epoxy equivalent can be determined by a method in which an epoxy compound is dissolved in pyridine, and 0.05N hydrochloric acid is added thereto, and after being heated at 45° C., the solution is back-titrated with 0.05N caustic soda by using a mixed liquid of thymol blue and cresol red as an indicator.

Furthermore, as for the aforementioned epoxy compound, a monofunctional glycidyl ester compound or an epoxy compound in which a glycidyl ether compound and a monofunctional glycidyl ester compound are both employed are preferably used. Particularly, a monofunctional glycidyl ester compound is more preferable from the balance between the viscosity stability and the hydrolysis resistance of the resultant composition.

Furthermore, the aforementioned glycidyl ester compound is not particularly limited. As specific examples, benzoic acid glycidyl ester, tBu-benzoic acid glycidyl ester, P-toluic acid glycidyl ester, cyclohexane carboxylic acid glycidyl ester, pelargonic acid glycidyl ester, stearic acid glycidyl ester, lauric acid glycidyl ester, palmitic acid glycidyl ester, behenic acid glycidyl ester, versatic acid glycidyl ester, oleic acid glycidyl ester, linoleic acid glycidyl ester, linolenic acid glycidyl ester, behenol acid glycidyl ester, stearol acid glycidyl ester, terephthalic acid diglycidyl ester, isophthalic acid diglycidyl ester, phthalic acid diglycidyl ester, naphthalenedicarboxylic acid diglycidyl ester, bibenzoic acid diglycidyl ester, methyl terephthalic acid diglycidyl ester, hexahydrophthalic acid diglycidyl ester, tetrahydrophthalic acid diglycidyl ester, cyclohexane dicarboxylic acid diglycidyl ester, adipic acid diglycidyl ester, succinic acid diglycidyl ester, sebacic acid diglycidyl ester, dodecanedionic acid diglycidyl ester, octadecane dicarboxylic acid diglycidyl ester, trimellitic acid triglycidyl ester, pyromellitic acid tetraglycidyl ester, etc. may be cited. As for these, the use of one species or two or more species is possible.

Furthermore, the aforementioned glycidyl ether compound is not particularly limited. As specific examples, phenyl glycidyl ether, o-phenyl phenyl glycidyl ether, 1,4-bis(β,γ-epoxypropoxy)butane, 1,6-bis(β,γ-epoxypropoxy)hexane, 1,4-bis(β,γ-epoxypropoxy)benzene, 1-(β,γ-epoxypropoxy)-2-ethoxyethane, 1-(β,γ-epoxypropoxy)-2-benzyloxyethane, 2,2-bis-[p-(β,γ-epoxypropoxy)phenyl]propane, and diglycidyl ethers obtained by reactions of other bisphenols, such as bis-(4-hydroxyphenyl)methane, etc., with epichlorohydrin, etc., may be cited. As for these, the use of one species or two or more species is possible.

Furthermore, the compounding amount of the (F) epoxy compound is preferably 0.05–5% by weight, and particularly preferably 0.1–4% by weight, in respect of the mechanical characteristic and hydrolysis resistance.

It is possible to compound a fiber reinforcement material in order to enhance the mechanical strength. As the fiber reinforcement material, glass fiber, aramid fiber, carbon fiber, etc., may be cited. As the aformentioend glass fiber, glass fibers which are of a chopped strand type or a roving type for use as a reinforcement material for ordinary polybutylene terephthalate resins and which have been treated with a sizing agent that contains a silane coupling agent, such as an aminosilane compound, an epoxysilane compound, etc., and/or urethane, vinyl acetate, one or more species of epoxy compounds, such as bisphenol A diglycidyl ethers, novolak based epoxy compounds, etc., etc., are preferably used. Furthermore, the silane coupling agent and/or the sizing agent mentioned above may be used as an emulsion liquid.

Furthermore, if a fiber reinforcement material is compounded, the compounding amount thereof is preferably 1–45% by weight, and particularly preferably 5–40% by weight, in view of the fluidity during forming and the durability of forming machines and molds.

Furthermore, an inorganic filler other than the fiber reinforcement material may further be compounded, which is for improving portions of the crystallization characteristic, arc resistance, anisotropy, mechanical strength, flame retardancy, heat deformation temperature, etc. of the composition. As the inorganic filler other than the fiber reinforcement material, inorganic fillers in a spicular form, a granular form, a powder form and a layer form may be cited though the inorganic filler is not limited thereto. As specific examples, glass beads, milled fiber, glass flakes, potassium titanate whisker, calcium sulfate whisker, wollastonite, silica, kaolin, talc, smectite based clay minerals (montmorillonite, hectorite), vermiculite, mica, fluoro-taeniolite, zirconium phosphate, titanium phosphate, dolomite, etc., may be cited, and may be used in a fashion of one or more species. Furthermore, on the inorganic filler other than the fiber reinforcement material, a surface treatment, such as an ionization treatment, etc., epoxy compound, a coupling agent treatment, may be performed. Furthermore, the average particle diameter of the granular-form, powder-form and layer-form inorganic fillers is preferably 0.1–20 μm, and particularly preferably 0.2–10 μm, in view of impact strength. Furthermore, the compounding amount of the inorganic filler other than the fiber reinforcement material is preferably an amount whose sum with the compounding amount of the fiber reinforcement agent does not exceed 1–45% by weight, in view of the fluidity during forming and the durability of forming machines and molds.

By compounding a fluorine based compound, the melt dripping of the flame-retardant resin composition during combustion can be restrained, and the flame retardancy can be further enhanced. The fluorine based compound is a compound containing fluorine in the substance's molecule. Specifically, polytetrafluoroethylene, polyhexafluoropropylene, (tetrafluoroethylene/hexafluoropropylene) copolymer, (tetrafluoroethylene/perfluoroalkyl vinyl ether) copolymer, (tetrafluoroethylene/ethylene) copolymer, (hexafluoropropylene/propylene) co-polymer, polyvinylidene fluoride, (vinylidene fluoride/ethylene) copolymer, etc., may be cited. In particular, polytetrafluoroethylene, (tetrafluoroethylene/perfluoroalkyl vinyl ether) copolymer, (tetrafluoroethylene/hexafluoropropylene) copolymer, (tetrafluoroethylene/ethylene) copolymer and polyvinylidene fluoride are preferable, and particularly polytetrafluoroethylene and (tetrafluoroethylene/ethylene) copolymer are preferable. Furthermore, if the fluorine based compound is compounded, the compounding amount thereof is 0.02–5% by weight, preferably 0.1–3% by weight, and more preferably 0.2–2% by weight, in view of flame retardancy and mechanical characteristic.

The flame retardancy can be further enhanced by further compounding a polycarbonate resin. As the aforementioned polycarbonate resin, aromatic homo- or co-polycarbonates obtained by reacting an aromatic dihydric phenol based compound and phosgene or carbonic acid diester may be cited. The aromatic homo- or co-polycarbonate resin is a resin whose weight-average molecular weight is in the range of 10,000–1100,000. If the glass transition temperature is about 150° C. and the weight-average molecular weight is in the range of 10,000–1,000,000, polycarbonate resins different in weight-average molecular weight may be used together. Polycarbonate resins having a weight-average molecular weight in the range of 60,000–1,100,000 are particularly preferably used. The weight-average molecular weight is a one obtained through measurement in terms of polystyrene by a gel permeation chromatography using tetrahydrofuran as a solvent. If the weight-average molecular weight is 10,000 or less, the excellent mechanical characteristic of the present invention is impaired, and therefore such weight-average molecular weight is not preferable. If the weight-average molecular weight is 110,000 or greater, the fluidity during forming is impaired, and therefore such weight-average molecular weight is not preferable.

Furthermore, polycarbonate resins whose melt viscosity index (melt flow index) measured by a melt indexer according to ASTM D1238 in the conditions of a temperature of 300° C. and a load of 1.2 kg is in the range of 1–100 g/10 min., and particularly 1–15 g/10 min. are preferably used in view of mechanical characteristic.

As the aromatic dihydric phenol based compound, 2,2-bis(4-hydroxyphenyl)propane, 2,2-bis(4-hydroxy-3,5-dimethyl phenyl)propane, bis(4-hydroxyphenyl)methane, 1,1-bis(4-hydroxyphenyl)ethane, 2,2-bis(4-hydroxyphenyl) butane, 2,2-bis(4-hydroxy-3,5-diphenyl)butane, 2,2-bis(4-hydroxy-3,5-diethyl phenyl)propane, 2,2-bis(4-hydroxy-3, 5-diethyl phenyl)propane, 1,1-bis(4-hydroxyphenyl) cyclohexane, 1-phenyl-1,1-bis(4-hydroxyphenyl)ethane, etc. may be used. These may be used singly or as a mixture. However, if an amount of polycarbonate resin exceeding 5% by weight is compounded, the hydrolyzability may sometimes considerably deteriorate, and therefore, attention is needed. A preferable compounding amount of polycarbonate resin is less than 0.1–5% by weight, and preferably 0.5–3% by weight, from the aforementioned hydrolysis resistance and flame retardancy. Furthermore, a polycarbonate resin oligomer may be compounded if the amount thereof is in such a range that the characteristics of the composition will not be impaired.

By compounding a small amount of an acidic phosphoric acid ester when the aforementioned polycarbonate resin is compounded, it is useful as an transesterification preventing agent for the (A) component and the polycarbonate resin, and particularly prevents decreases in the heat deformation temperature, etc. The aforementioned acidic phosphoric acid ester is an alkyl acid phosphate compound of a partial ester between an alcohol or the like and a phosphoric acid, And a low-molecular weight one is colorless liquid, and a high-molecular weight one is in a white wax-form or flake-form solid. Specific examples of the aforementioned acidic phosphoric acid ester, although it is not limited thereto, may be monomethyl acid phosphate, monoethyl acid phosphate, monoisopropyl acid phosphate, monobutyl acid phosphate, monolauryl acid phosphate, monostearyl acid phosphate, monododecyl acid phosphate, monobehenyl acid phosphate, dimethyl acid phosphate, diethyl acid phosphate, diisopropyl acid phosphate, dibutyl acid phosphate, lauryl acid phosphate, distearyl acid phosphate, didodecyl acid phosphate, dibehenyl acid phosphate, trimethyl acid phosphate, triethyl acid phosphate, and mixtures of the aforementioned mono's and di's, mixtures of the aforementioned mono's, di's and tris', mixtures of one or more species of the aforementioned compounds. As acidic phosphoric acid esters preferably used, long chain alkyl acid phosphate compounds, such as mixtures of mono- and di-stearyl acid phosphates, etc., may be cited, and such a compound is commercially sold in the name of "Adeka Stab" AX-71 by Asahi Denka Co., and is a flake-form solid having a melting point.

The compounding amount of the aforementioned acidic phosphoric acid ester is preferably 0.01–0.5% by weight, and particularly preferably 0.02–0.3% by weight, in view of heat deformation temperature and mechanical characteristic.

A flame retarding assistant that assists in flame retardancy, such as a silicone compound, a phenol resin, a phosphonitrile compound, polyammonium phosphate, polymelamine phosphate, etc., may further be compounded. Such assistants may be used in a fashion of one or more species. If the aforementioned flame retarding assistant is compounded, the compounding amount thereof is preferably 1–10% by weight, and particularly preferably 2–7.5% by weight, in view of flame retardancy and mechanical properties.

As the aforementioned silicone compound, silicone resin, silicone oil and silicone powder may be cited.

As the aforementioned silicone resin, polyorganosilanes in which siloxane and a group selected from saturated or unsaturated monovalent hydrocarbon radical, hydrogen atom, hydroxyl group, alkoxyl group, aryl group, vinyl or allyl group, are chemically bonded, may be cited. Ones having a viscosity of about 200–300000000 centipoises at room temperature are preferable; however, as long as one is a silicone resin as mentioned above, it is not restricted by that. The product configuration may be an oil form, a powder form, or a gum form. Introduction of epoxy group, methacryl group and amino group as a functional group is permissible. A mixture of two or more species of silicone resins is also permissible.

As the silicone oil, polyorganosilanes in which siloxane and a group selected from saturated or unsaturated monovalent hydrocarbon radical, hydrogen atom, hydroxyl group, alkoxyl group, aryl group, vinyl or allyl group, are chemically bonded, may be cited. Ones having a viscosity of about 0.65–100,000 centistokes at room temperature are preferable; however, as long as one is a silicone oil resin as mentioned above, it is not restricted by that. The product configuration may be an oil form, a powder form, or a gum form. Introduction of epoxy group, methacryl group and amino group as a functional group is permissible. A mixture of two or more species of silicone oils or silicone resins is also permissible.

As the silicone powder, ones in which an inorganic filler is compounded with the aforementioned silicone resin and/or silicone oil may be cited. As the inorganic filler, silica, etc. may be preferably used.

The aforementioned phenol resin is an arbitrary one if it is a macromolecule having a plurality of phenolic hydroxyl groups. For example, novolac type, resole type and heat-reactive type resins, or resins modified therefrom may be cited. These may be an uncured resin in which a curing agent is not added, a semi-cured resin, or a cured resin. In particular, curing agent-unadded and non-heat reactive novolac type phenol resins or melamine-modified novolac type phenol resins are preferable in view of flame retardancy, mechanical property and economy.

The configuration thereof is not preferably restricted, but any one of a milled product, a granular form, a flake form, a powder form, a spicular form, a liquid form, etc., may be employed. In accordance with need, one species or two or more species thereof may be employed. The phenol based resin is not particularly limited, and commercially sold ones, etc. are used. For example, in the case of a novolac type phenol resin, a phenol or the like and an aldehyde or the like are placed in a reaction chamber at such a ratio that the molar ratio therebetween is 1:0.7–1:0.9. After a catalyst, such as oxalic acid, hydrochloric acid, sulfuric acid, toluene, sulfonic acid, etc., is added, heating is performed to conduct a reflux reaction for a predetermined time. In order to remove the generated water, vacuum dehydration or still-standing dehydration is performed. Furthermore, remaining water and unreacted phenol or the like are removed. By this method, a novolac type phenol resin can be obtained. These resins or copolycondensed phenol resins obtained by using a plurality of material components may be used singly, or two or more species thereof may be used.

In the case of resole type phenol resin, the resin can be obtained by placing a phenol or the like and an aldehyde or the like in a reaction chamber at such a ratio that the molar ratio therebetween is 1:1–1:2, and adding a catalyst, such as a sodium hydroxide, an ammonia water or other basic substance, etc., and then conducting the reaction and treatment similar to those of the novolac type phenol resin.

As the phenol or the like, phenol, o-cresol, m-cresol, p-cresol, thymol, p-tert-butyl phenol, tert-butyl catechol, catechol, isoeugenol, o-methoxy phenol, 4,4'-dihydroxyphenyl-2,2-propane, isoamyl salicylate, benzyl salicylate, methyl salicylate, 2,6-di-tert-butyl-p-cresol, etc. may be cited. As for these phenols and the like, one species or two or more species may be used. On the other hand, the aldehyde or the like, formaldehyde, paraformaldehyde, polyoxymethylene, trioxane, etc., may be cited. As for these aldehydes and the like, one species or two or more species may be used in accordance with need.

The molecular weight of the phenol based resin is not particularly limited, but is preferably 200–2,000 in number-average molecular weight. In particular, ones in the range of 400–1,500 are preferable as they are excellent in mechanical property, fluidity and economy. Incidentally, the molecular weight of phenol based resin can be measured through a gel permeation chromatography method by using a tetrahydrafuran solution and a polystyrene standard sample.

As for the aforementioned phosphonitrile compound, phosphonitrile compounds having a phosphonitrile linear polymer and/or cyclic polymer as a main component may be cited, and may well be of a straight chain form or a cyclic form, or a mixture thereof. The aforementioned phosphonitrile linear polymer and/or cyclic polymer may be synthesized by a known method described in "Synthesis and Application of Phosphazene Compounds" authored by Kajiwara, etc. For example, it can be synthesized by reacting phosphorous pentachloride or phosphorous trichloride as a phosphorous source, and ammonium chloride or an ammonia gas as a nitrogen source by a known method (purifying a cyclic substance is also permissible), and substituting the obtained matter with alcohol, phenol, and an amine or the like.

As the aforementioned polyammonium phosphate, polyammonium phosphate, melamine-modified polyammonium phosphate, carbamoyl polyammonium phosphate, etc., may be cited. These may be coated with a thermosetting resin that exhibits a thermosetting characteristic, such as phenol resin, urethane resin, melamine resin, urea resin, epoxy resin, urea resin, etc., and may be used in a one-species fashion, and may also be used in a two-or-more species fashion.

As the aforementioned polymelamine phosphate, polymelamine phosphates of melamine phosphate, melamine pyrophosphate, etc., may be cited. These may be used in a one-species fashion, and may also be used in a two-or-more species fashion.

An ethylene (co)polymer may further be compounded for the purpose of improving the toughness of the composition, such as the impact strength, etc. As the ethylene (co)polymer, ethylene polymers, such as high density polyethylene, low density polyethylene, very low density polyethylene, etc., and/or ethylene copolymers. The foregoing ethylene copolymer is obtained by copolymerizing ethylene and a monomer copolymerizable therewith. As the copolymerizable monomer, propylene, butene-1, vinyl acetate, isoprene, butadiene, or monocarboxylic acids and the like, such as acrylic acid, methacrylic acid, etc., or ester acids and the like thereof, dicarboxylic acids and the like, such as maleic acid, fumaric acid, itaconic acid, etc., etc. may be cited. The ethylene copolymer can be produced by an ordinarily known method. As specific examples of the ethylene copolymer, ethylene/propylene, ethylene/butene 1, ethylene/vinyl acetate, ethylene/ethyl acrylate, ethylene/methyl acrylate, ethylene/ethyl methacrylate acrylate, etc. may be cited. Furthermore, copolymers in which an acid anhydride or glycidyl methacrylate is graft- or co-polymerized with the aforementioned ethylene (co)polymer may preferably be used. These are used in a fashion of one species or two or more species, and may be used as a mixture with one or more species of the aforementioned ethylene (co)polymers. Furthermore, among the ethylene (co)polymers, a copolymer in which an acid anhydride or a glycidyl methacrylate is graft- or polymerized with polyethylene is preferably used since its compatibility with the (A) component is good. Furthermore, if the ethylene (co)polymer is compounded, the compounding amount thereof is preferably 1–10% by weight, and particularly preferably 2–7.5% by weight, in view of the flame retardancy and the impact strength of the resultant composition.

Phenoxy resin, an oxazoline compound, a carbodiimide compound, etc., which are hydrolysis resistance-improving materials, may be compounded. Particularly, phenoxy resin is preferably used. Furthermore, if the aforementioned hydrolysis resistance-improving material is compounded, the compounding amount thereof is preferably 0.1–7.5% by weight, and particularly preferably 0.2–5% by weight, in view of the hydrolysis resistance and the flame retardancy of the resultant composition.

Furthermore, as the aforementioned phenoxy resin, phenoxy resins obtained by reacting an aromatic dihydric phenol based compound and epichlorohydrin at various compounding proportions may be cited. The molecular weight of the phenoxy resin is not particularly limited, but is preferably in the range of 1,000–100,000 in viscosity-average molecular weight. Here, as examples of the aromatic dihydric phenol based compound, 2,2-bis(4-hydroxyphenyl)propane, 2,2-bis(4-hydroxy-3,5-dimethyl phenyl)propane, bis(4-hydroxyphenyl)methane, 1,1-bis(4-hydroxyphenyl)ethane, 2,2-bis(4-hydroxy-3,5diethyl phenyl)propane, 1,1-bis(4-hydroxyphenyl)cyclohexane, 1-phenyl-1,1-bis(4-hydroxyphenyl)ethane, 2,2-bis(4-hydroxyphenyl)methane, etc., may be used. These may be used singly or as a mixture. The configuration thereof is not particularly restricted, but any one of a milled product, a granular form, a flake form, a powder form, a spicular form, a liquid form, etc., may be employed. As for these phenoxy resins, one species or two or more species of may be used in accordance with need.

A hindered phenol antioxidant and/or a phosphite antioxidant may further be compounded as a stabilizing agent for providing very good anti-heat aging characteristic even if the composition of the is exposed to high temperature for a long time may be compounded. If a hindered phenol antioxidant and/or a phosphite antioxidant is compounded, the compounding amount thereof is preferably 0.1–2% by weight, and particularly preferably 0.2–1% by weight, in view of anti-heat aging characteristic and flame retardancy.

Furthermore, as specific examples of the aforementioned hindered phenol antioxidant, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], pentaerythrityl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, 3,5-di-t-butyl-4-hydroxybenzylphosphonate diethyl ester, 1,3,5-trimethyl-2,4,6-tris(3,5-di-t-butyl-4-hydroxybenzyl)benzene, bis or tris (3-t-butyl-6-methyl-4-hydroxyphenyl)propane, N,N'-hexamethylenebis(3,5-di-t-butyl-4-hydroxy-hydrocinnamaide), N,N'-trimethylenebis(3,5-di-t-butyl-4-hydroxy-hydrocinnamaide), etc. may be cited.

Furthermore, as examples of the aforementioned phosphite anti-oxidant, tris(2,4-di-t-butyl phenyl)phosphite, 2,2-methylenebis(4,6-di-t-butyl phenyl)octyl phosphite, tris-nonylphenyl phosphite, alkyl allyl based phosphite, trialkyl phosphite, triallyl phosphite, pentaerythritol based phosphite compounds, etc., may be cited.

It is possible to improve the fluidity and the mold releasability during forming by adding one or more species of lubricants. As the lubricant, metallic soaps, such as calcium stearate, barium stearate, etc., fatty acid esters, salts of fatty acid esters (including partially salt-converted ones as well), fatty amides, such as ethylenebisstearoamide, etc., fatty amides made of polycondensates made of ethylene diamine, stearic acid and sebacic acid, or polycondensates of phenylene diamine, stearic acid and sebacic acid, polyalkylene wax, acid anhydride-modified polyalkylene wax, and mixtures of aforementioned lubricants with fluorine based resins or fluorine based compounds may be cited. However, the aforementioned lubricant is not limited thereto. If a lubricant is compounded, the compounding amount thereof is preferably 0.05–2% by weight, and more preferably 0.1–1% by weight.

It is also possible to tone resins to various colors and improve the weather (light) resistance and the electrical conductivity by compounding one of more species of carbon black, titanium oxide and various color pigments and dyes. The compounding amount thereof is preferably 0.1–3% by weight, and more preferably 0.1–2% by weight, in view of the mechanical characteristic of the resultant composition.

As for the aforementioned carbon black, there is no limitation, but channel black, furnace black, acetylene black, anthracene black, lamp black, pine black, graphite, etc. may be cited. Carbon blacks having an average particle diameter of 500 nm less and a dibutyl phthalate oil absorption amount of 50–400 $cm^3$/100 g may be preferably used. Treatment with aluminum oxide, silicon oxide, zinc oxide, zirconium oxide, polyol, a silane coupling agent, etc. as a treating agent is also permissible.

Furthermore, as for the aforementioned titanium oxide, titanium oxides having a crystal form of a rutile type, an anatase type, etc., and having an average particle diameter of 5 µm or less are preferably used, and treatment with aluminum oxide, silicon oxide, zinc oxide, zirconium oxide, polyol, a silane coupling agent, etc. as a treating agent is also permissible. Furthermore, the carbon black, the titanium oxide and the various color pigments and dyes mentioned above may be used as a mixed material melt-blended or simply blended with various thermoplastic resins, in order to enhance the dispersibility with respect to the flame-retardant resin composition of the present invention and enhance the handling characteristic during production. Particularly, as the aforementioned thermoplastic resins, polyalkylene terephthalate is preferably used.

It is also possible to add one or more species of known non-halogenated flame retardants other than the present invention, so that reduction of the combustion time during combustion or reduction of gas generated during combustion can be expected. As for the known non-halogenated flame retardants, there is no limitation, but, for example, aluminum hydroxide, hydrotalcite, boric acid, calcium borate, calcium borate hydrate, zinc borate, zinc borate hydrate, zinc hydroxide, zinc hydroxide hydrate, zinc tin hydroxide, zinc tin hydroxide hydrate, red phosphorus, thermally expanded graphite, dawsonite, etc. may be cited. Mixture or surface coating with a thermosetting resin, such as a thermosetting melamine resin, a thermosetting phenol resin, a thermosetting epoxy resin, etc., is also permissible. Furthermore, mixture or surface coating with a coupling agent, an epoxy compound, or a fat-and-oil or the like, such as stearic acid, etc., etc., is also permissible.

Still further, a material in which one or more species of known additives, such as an sulfur type antioxidant, an ultraviolet absorber, a plasticizer, an antistatic agent, etc., are compounded may be used in such a range that the purposes of the present invention are not impaired, in the flame-retardant polybutylene terephthalate resin composition and formed article of the present invention.

Although addition of a polyphenylene ether resin or a polyphenylene sulfide resin is preferable in order to further improve the flame retardancy, the addition thereof may sometimes deteriorate the tracking resistance, hydrolysis resistance, metal pollution characteristic, and it is preferable that those resins not be compounded. If a resin mentioned above is compounded, it is preferable that the amount thereof not exceed 5% by weight.

The flame-retardant polybutylene terephthalate resin composition and formed article are produced by ordinarily known methods. For example, (A) a polybutylene terephthalate resin or a mixture of a polybutylene terephthalate resin and a polyethylene terephthalate resin, (B) a vinyl based resin, (C) a phosphoric acid ester, (D) a salt of a triazine based compound and cyanuric acid or isocyanuric acid, (E) an alkaline earth metal compound, and, in accordance with need, (F) an epoxy compound, a fiber reinforcement material, such as glass fiber, etc., and furthermore, in accordance with need, an inorganic filler other than the fiber reinforcement material, a fluorine based compound, a polycarbonate resin, various flame retarding assistants, an ethylene (co)polymer, a hydrolysis resistance improving material, a hindered phenol antioxidant and/or a phosphite antioxidant, and still further, in accordance with need, other necessary additives, coloring agents, such as pigments, dyes, etc., are pre-mixed or not pre-mixed, and are then supplied to an extruder, etc., and are thoroughly melted and kneaded, whereby a flame-retardant polybutyrerene terephthalate resin composition is prepared.

As an example of the aforementioned premixing, the mixing through the use of a mechanical mixing device, such as a tumbler, a ribbon mixer, a Henschel mixer, etc., may be cited, although the dry blending alone can still deliver the desired effects. Furthermore, as for the fiber reinforcement material, a method in which a side feeder is disposed at an intermediate point between the breech-loading portion and a vent portion of a multi-screw extruder, such as a twin-screw extruder, etc., and the material is loaded through the side feeder, is also permissible. Furthermore, in the case of a liquid additive, a method in which a liquid loading nozzle is disposed at an intermediate point between the breech-loading portion and a vent portion of a multi-screw extruder, such as a twin-screw extruder, etc., and the additive is loaded therethrough by using a plunger pump, or a method in which the additive is supplied through the breech-loading portion, etc. with a metering pump, etc. is also permissible.

Furthermore, in production of the flame-retardant polybutylene terephthalate resin composition, it is possible to use a single-screw extruder, a twin-screw extruder or a three-screw extruder equipped with, for example, "Unimelt" or "Dulmage" type screws, or a kneader type kneading machine, etc. although this is not restrictive.

The thus-obtained flame-retardant polybutylene terephthalate resin composition can be formed by ordinarily known methods. For example, by injection molding, extrusion molding, compression molding, sheet forming, film forming, etc., the resin composition can be made into formed articles of any configuration. In particular, injection molding is preferred, and a formed article obtained by an injection molding method based on insert molding in which a portion of a metallic component part is directly integrated with a formed article is also permissible.

EXAMPLES

The effects of the composition will be described further in detail with reference to examples. Herein, % and part(s) all represent % by weight and parts by weight, and "/" in reference examples means copolymerization. Measurement methods for individual characteristics are as follows.

Reference Example 1

(A) Polybutylene Terephthalate Resin (Hereinafter, Simply Referred to as PBT)

<A-1> Toray PBT-1100S (produced by Toray Co.): A PBT of 0.85 in intrinsic viscosity (25° C., an ortho-chlorophenol solvent) was used.

Reference Example 2

(A) Polyethylene Terephthalate Resin (Hereinafter, Simply Referred to as PET)

<A-2> Mitsui PETJ005 (produced by Mitsui PET Resin Co.): A PET of 0.65 in intrinsic viscosity (25° C., a mixed solvent of phenol/tetrachloroethane at 1:1) was used.

Reference Example 3

(B) Vinyl Based Resin

<B-1> An acrylonitrile/styrene copolymer (hereinafter, simply referred to as AS) of acrylonitrile/styrene copolymer (13/87% by weight) was used. Incidentally, the limiting viscosity thereof measured at 30° C. in a methyl ethyl ketone solvent is 0.42 dl/g.

<B-2> An As of acrylonitrile/styrene copolymer (26/74% by weight) was used. Incidentally, the limiting viscosity thereof measured at 30° C. in a methyl ethyl ketone solvent is 0.45 dl/g.

<B-3> An AS of acrylonitrile/styrene copolymer (45/55% by weight) was used. Incidentally, the limiting viscosity thereof measured at 30° C. in a methyl ethyl ketone solvent is 0.48 dl/g.

<B-4> An epoxy-modified AS of acrylonitrile/styrene/glycidyl methacrylate copolymer (25.5/74/0.5% by weight) was used. Incidentally, the limiting viscosity thereof measured at 30° C. in a methyl ethyl ketone solvent is 0.53 dl/g.

<B-5> An AS of acrylonitrile/styrene copolymer (7/93% by weight) was used. Incidentally, the limiting viscosity thereof measured at 30° C. in a methyl ethyl ketone solvent is 0.40 dl/g.

<B-6> An AS of acrylonitrile/styrene copolymer (55/45% by weight) was used. Incidentally, the limiting viscosity thereof measured at 30° C. in a methyl ethyl ketone solvent is 0.49 dl/g.

<B-7> A polystyrene resin (hereinafter, simply referred to as PS) ("Estyrene" G13 produced by Shinnittetsu Kagaku Kogyo Co.) was used.

<B-8> A polymethyl methacrylate resin (hereinafter, simply referred to as PMMA) ("Acrypet" MF produced by Mitsubishi Rayon Co.) was used.

<B-9> An acrylonitrile/butadiene/styrene copolymer (hereinafter, simply referred to as ABS), ("Toyolac" type 100 produced by Toray Co.) was used.

<B-10> Core: A silicone/acrylic polymer was used. Shell: A methyl methacrylate polymer ("Metablen" S2001 produced by Mitsubishi Rayon Co.) was used.

<B-1> Core: A silicone/acrylic polymer was used. Shell: acrylonitrile/styrene polymer ("Metablen" SX006 produced by Mitsubishi Rayon Co.) was used.

<B-12> Core: A silicone/acrylic polymer was used. Shell: A methyl methacrylate/glycidyl methacrylate polymer ("Metablen" KS0205 produced by Mitsubishi Rayon Co.) was used.

Reference Example 4

(C) Phosphoric Acid Ester

<C-1> An aromatic phosphoric acid ester "PX-200" (produced by Daihachi Kagaku Co.) of the following expression (6) was used.

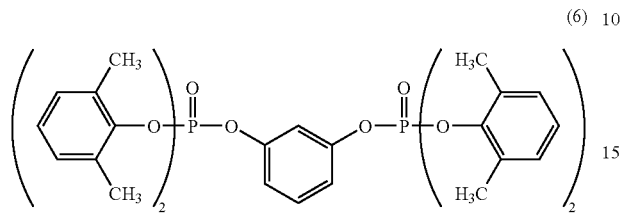

<C-2> An aromatic phosphoric acid ester "CR741" (produced by Daihachi Kagaku Co.) of the following expression (7) was used.

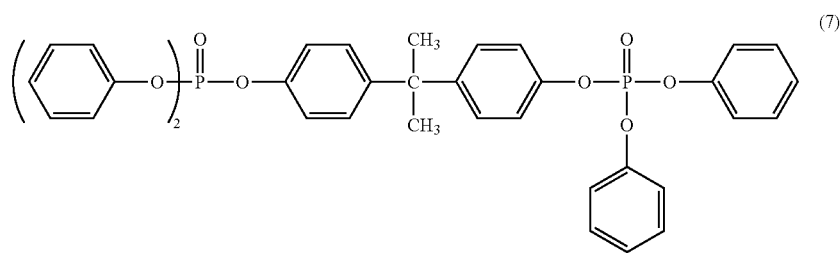

Reference Example 5

(D) Salt of a Triazine Based Compound and Cyanuric Acid or Isocyanuric Acid

<D-1> A melamine cyanurate "MCA" (produced by Mitsubishi Kagaku Co.) was used (hereinafter, simply referred to as MC salt).

Reference Example 6

(E) Alkaline Earth Metal Compound

<E-1> Magnesium hydroxide "Kisuma 6E" (produced by Kyowa Kagaku Kogyo Co.)
<E-2> Calcium carbonate "KSS1000" (produced by Dowa Calfine Co.)

Reference Example 7

(F) Epoxy Compound

<F-1> Versatic acid glycidyl ester "Cardura E10" (produced by Japan Epoxy Resin Co.) (hereinafter, simply referred to as monofunctional glycidyl ester)
<F-2> A mixture of 30% by weight of versatic acid glycidyl ester "Cardura E10" (produced by Japan Epoxy Resin Co.) and 70% by weight of bisphenol A diglycidyl ether "Epikote 828" (produced by Japan Epoxy Resin Co.). (hereinafter, simply referred to as a mixture of monofunctional diglycidyl ester and didiglycidyl ether)

Reference Example 8

Fiber Reinforcement Material

<G-1> A chopped strand-form glass fiber "CS3J948" (produced by Nitto Boseki Co.) having a fiber diameter of 10 μm was used (hereinafter, simply referred to as GF).

Reference Example 9

Fluorine Based Compound

<H-1> A polytetrafluoroethylene "Teflon® 6-J" (produced by Mitsui-DuPont Fluorochemicals Co.) was used (hereinafter, simply referred to as Teflon).

Reference Example 10

Silicone Compound

<I-1> A silicone powder "DC4-7105" (produced by Toray Dow Corning Silicone Co.) was used.

Reference Example 11

Phenol Resin

<I-2> A novolac type phenol resin "Sumilite Resin" PR53195 (produced by Sumitomo Durez Co.) was used.

Reference Example 12

Phosphonitrile Compound

<I-3> A hexachlorocyclotriphosphazene (cyclic trimer) and phenol were reacted in the presence of triethyl amine in THF. The resultant reaction liquid was evaporated and dried, and was washed with water to remove salt. Yield: 95%. The thus-obtained phosphonitrile cyclic polymer was purified by recrystallization from acetone, and then was used. There was no change in the number-average polymerization degree n, but n=3.

Reference Example 13

Ethylene Copolymer

<J-1> An ethylene ethyl acrylate copolymer "A-709" (produced by Mitsui-DuPont Polychemicals Co.) was used.

Reference Example 14

Hydrolysis Resistance-Improving Material

<K-1> A phenoxy resin "Phenotohto" YP-50 (produced by Tohto Kasei Kogyo Co.) was used.

Reference Example 15

Hindered Phenol Antioxidant and/or Phosphite Antioxidant

<L-1> A hindered phenol antioxidant "IR-1010" (produced by Nippon Ciba-Geigy Co.) of pentaerythrityl-tetrakis [3-(3,5-di-t-butyl-4-hydroxyphenyl) propionate].

<L-2> A phosphite antioxidant "Mark PEP-36" (produced by Asahi Denka Co.) of pentaerythritol based phosphite compound.

Reference Example 16

Polycarbonate Resin "Iupilon" S-3000 (Produced by Mitsubishi Engineering-Plastics Co.) (Hereinafter, Simply Referred to as PC).

Reference Example 17

Polyphenylene Ether Resin "YPX-100L" (Produced by Mitsubishi Engineering-Plastics Co.) (Hereinafter, Simply Referred to as PPE).

Reference Example 18

Polyphenylene Sulfide "Torelina" M2588 (Produced by Toray Co.) (Hereinafter, Simply Referred to as PPS)

Examples 1–32, Comparative Examples 1–15

Using a co-rotating vent-equipped twin-screw extruder having a screw diameter of 30 mm and an L/D of 35 (TEX-30α produced by Nihon Seikosho), (A) PBT, PET, (B) a vinyl based resin, (C) a phosphoric acid ester, and (D) MC salt, and <E> an alkaline earth metal compound, as well as other additives <F>, <G>, <H>, <I>, <J>, <K>, <L>, etc. were mixed as in compounding compositions shown in Table 1–Table 5, and were loaded through a breech-loading portion; In the examples in which the GF of <G> was compounded, a side feeder was disposed at an intermediate point between the breech-loading portion and the vent portion, and the loading amounts of compounded materials shown Table 1 were loaded through the breech-loading portion in the same manner as described above, except that a side feeder was disposed at an intermediate point between the breech-loading portion and the vent portion. Melt mixture was performed in extrusion conditions of a kneading temperature of 270° C. and a crew rotation of 150 rpm, to eject the material in a strand form, which was passed through a cooling bath, and then pelletized by a strand cutter.

After the obtained pellets were dried, an injection molding machine was subsequently used to form various test pieces, and properties thereof were measured in the following conditions. Results are shown in Table 1–Table 5.

(1) Flame Retardancy

Using an IS55 EPN injection molding machine produced by Toshiba Kikai, injection molding of test pieces for flame retardancy evaluation was performed in the conditions of a molding temperature of 260° C. and a mold temperature of 70° C. In accordance with the evaluation criterion defined in the UL94 vertical test, the flame retardancy thereof was evaluated. The flame retardancy decreases in the order of V-0>V-1>V-2, and the ranking was performed. As for the thickness of the test pieces, a thickness of 1/32 inch (about 0.79 mm, which is hereinafter simply referred to as about 0.8 mm), and a thickness of 1/64 inch (about 0.40 mm, which is hereinafter simply referred to as about 0.4 mm) were employed. Less thicknesses face severer evaluations in flame retardancy. Materials that were inferior in flame retardancy and did not reach the aforementioned V-2 and did not fall into any one of the aforementioned flame retardancy ranks were evaluated as nonstandard.

(2) Tensile Strength

Using an IS55 EPN injection molding machine produced by Toshiba Kikai, injection molding of ASTM #1 dumbbells of 3 mm in thickness was performed in the conditions of a molding temperature of 260° C. and a mold temperature of 70° C. Tensile strengths of the dumbbells were measured according to ASTM D638.

(3) Hydrolysis Resistance

The aforementioned ASTM #1 dumbbell pieces of 3 mm in thickness were subjected to a wet heat treatment for 100 hours in a pressure cooker tester TPC-411 produced by Tabai Co. in the conditions of a temperature of 121° C. and a humidity of 100% RH. After that, tensile strengths thereof were measured as described above. Measured values were divided by the tensile strength of an untreated piece, and values thus obtained are presented as percentages, that is, tensile strength retention rates (%).

(4) Tracking Resistance

Using, as specimens, square plates of 80 mm×80 mm×3 mm in thickness injection-molded in the conditions of a molding temperature of 260° C. and a mold temperature of 70° C. through the use of an IS55 EPN injection molding machine produced by Toshiba Kikai, 0.1% ammonium chloride aqueous solution as an electrolyte solution was dropped at every 30±5 seconds according to the test method presented in the IEC Publication 112 standard. The numbers of drops of the electrolyte solution and the applied voltages before destruction was reached were plotted. An applied voltage causing destruction with 50 drops was read from the graph, and the read numerical value was defined as a relative tracking index (V).

(5) Metal Pollution Characteristic

About 10 g of pellets was placed in a 100-cc Erlenmeyer flask equipped with a stopper, a silver plate of about 5×10 mm×0.5 mm in thickness was hung in an upper portion of the flask with a cotton thread and the stopper was set. Then, a seal tape was wound around a stopper portion. After that, the flask was placed in a hot air dryer "HighTempOven" PVH210 produced by Tabai Co. whose temperature was controlled at 120° C., and was heat-treated for 100 hours.

Analysis of P atoms on a surface of the silver plate following the treatment was performed with an SEM (reflection type electronic microscope "S-2000A type" produced by Hitachi) and an XMA (energy dispersive type X-ray microanalyzer produced by Horiba Seisakusho). Herein, detection of P atoms by the SEM-XMA means the presence of a phosphorus compound on the sliver plate surface. In the case of no such detection, only a peak of sliver atom is detected.

0: P atoms not detected.

1: A P atom peak having a height equal to or less than 1/10 of the height of the silver atom peak is detected.

2: A P atom peak having a height equal to or less than 2/10 of the height of the silver atom peak is detected.

3: A P atom peak having a height equal to or less than 3/10 of the height of the silver atom peak is detected.

5: A P atom peak having a height equal to or less than 5/10 of the height of the silver atom peak is detected.

10: A P atom peak greater than the height of the silver atom peak is detected.

(6) Izod Impact

Using an IS55 EPN injection molding machine produced by Toshiba Kikai, injection-molded articles of Izod impact test pieces of 3 mm in thickness were obtained in the conditions of a molding temperature of 260° C. and a mold temperature of 70° C.

According to ASTM D256, Izod V notch impact strength was measured.

(7) Heat Resistance

Using an IS55 EPN injection molding machine produced by Toshiba Kikai, injection molding of ASTM #1 dumbbells of 3 mm in thickness was performed in the conditions of a molding temperature of 260° C. and a mold temperature of 70° C. After the dumbbells were placed for 200 hours in a hot air dryer "HighTempOven" PVH210 produced by Tabai Co. whose temperature was controlled at 175° C., tensile strengths thereof were measured. Measured values were divided by the tensile strength of an untreated piece, and values thus obtained are presented as percentages, that is, tensile strength retention rates (%).

TABLE 1

| Composition | Compounding amount | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| <A-1> PBT | % | 27 | 27 | 27 | 27 | 27 | 27 | 27 | 27 | 27 | 27 | 27 | 27 | 27 |
| <B-1> AS | " | 8 | — | — | — | — | — | — | — | — | — | — | — | — |
| <B-2> AS | " | — | 8 | — | — | — | — | — | — | — | — | — | — | 8 |
| <B-3> AS | " | — | — | 8 | — | — | — | — | — | — | — | — | — | — |
| <B-4> Epoxy-modified AS | " | — | — | — | 8 | — | — | — | — | — | — | — | — | — |
| <B-5> AS | " | — | — | — | — | 8 | — | — | — | — | — | — | — | — |
| <B-6> AS | " | — | — | — | — | — | 8 | — | — | — | — | — | — | — |
| <B-7> PS | " | — | — | — | — | — | — | 8 | — | — | — | — | — | — |
| <B-8> PMMA | " | — | — | — | — | — | — | — | 8 | — | — | — | — | — |
| <B-9> ABS | " | — | — | — | — | — | — | — | — | 8 | — | — | — | — |
| <B-10> Multilayer structure | " | — | — | — | — | — | — | — | — | — | 8 | — | — | — |
| <B-11> Multilayer structure | " | — | — | — | — | — | — | — | — | — | — | 8 | — | — |
| <B-12> Multilayer structure | " | — | — | — | — | — | — | — | — | — | — | — | 8 | — |
| <C-1> Phosphoric acid ester | " | 12 | 12 | 12 | 12 | 12 | 12 | 12 | 12 | 12 | 12 | 12 | 12 | — |
| <C-2> Phosphoric acid ester | " | — | — | — | — | — | — | — | — | — | — | — | — | 12 |
| <D-1> MC salt | " | 18 | 18 | 18 | 18 | 18 | 18 | 18 | 18 | 18 | 18 | 18 | 18 | 18 |
| <E-1> Magnesium hydroxide | " | — | — | — | — | — | — | — | — | — | — | — | — | 0.5 |
| <E-2> Calcium carbonate | " | 0.5 | 0.5 | 0.5 | 0.5 | 0.5 | 0.5 | 0.5 | 0.5 | 0.5 | 0.5 | 0.5 | 0.5 | — |
| <G-1> GF | " | 34.5 | 34.5 | 34.5 | 34.5 | 34.5 | 34.5 | 34.5 | 34.5 | 34.5 | 34.5 | 34.5 | 34.5 | 34.5 |
| Property | Unit | | | | | | | | | | | | | |
| Flame retardancy (about 0.8 mm thick) | Rank | V-0 | V-0 | V-0 | V-0 | V-0 | V-0 | V-0 | V-0 | V-0 | V-0 | V-0 | V-0 | V-0 |
| Tensile strength | MPa | 129 | 131 | 130 | 135 | 124 | 112 | 116 | 114 | 112 | 112 | 123 | 118 | 128 |
| Hydrolysis resistance (tensile strength retention rate) | % | 51 | 58 | 61 | 63 | 53 | 48 | 43 | 41 | 40 | 40 | 51 | 44 | 55 |
| Tracking resistance | V | 650 | 650 | 650 | 650 | 625 | 625 | 550 | 650 | 550 | 550 | 600 | 600 | 600 |
| Metal pollution characteristic | Rank | 0 | 0 | 0 | 0 | 1 | 1 | 2 | 2 | 2 | 2 | 1 | 2 | 0 |

TABLE 2

| Composition | Compounding amount | Comparative example 1 | Comparative example 2 | Comparative example 3 | Example 14 | Comparative example 4 | Example 15 | Comparative example 5 | Example 16 | Comparative example 6 |
|---|---|---|---|---|---|---|---|---|---|---|
| <A-1> PBT | % | 35 | 27 | 35 | 20 | 13 | 27 | 27 | 27 | 27 |
| <B-2> AS | " | — | 8 | — | 15 | 22 | 8 | 8 | 8 | 8 |
| <C-1> Phosphoric acid ester | " | 12 | 12 | 12 | 12 | 12 | 17 | 22 | 5 | — |
| <D-1> MC salt | " | 18 | 18 | 18 | 18 | 18 | 13 | 8 | 25 | 33 |
| <E-2> Calcium carbonate | " | — | — | 0.5 | 0.5 | 0.5 | 0.5 | 0.5 | 0.5 | 0.5 |
| <G-1> GF | " | 35 | 34.5 | 34.5 | 34.5 | 34.5 | 34.5 | 34.5 | 34.5 | 31.5 |
| Circumstances during injection molding | | — | — | — | — | — | — | — | — | Formed article not obtained |
| Property | Unit | | | | | | | | | |
| Flame retardancy (about 0.8 mm thick) | Rank | V-0 | V-0 | V-0 | V-1 | Non-standard | V-0 | V-0 | V-0 | — |
| Tensile strength | MPa | 121 | 125 | 122 | 133 | 124 | 118 | 103 | 108 | — |
| Hydrolysis resistance (tensile strength retention rate) | % | 7 | 24 | 22 | 54 | 30 | 45 | 11 | 52 | — |
| Tracking resistance | V | 375 | 625 | 375 | 650 | 550 | 600 | 650 | 650 | — |
| Metal pollution characteristic | Rank | 10 | 1 | 5 | 0 | 0 | 0 | 5 | 0 | — |

TABLE 3

| Composition | Compounding amount | Example 17 | Example 18 | Example 19 | Example 20 | Comparative example 7 | Comparative example 8 | Comparative example 9 | Comparative example 10 | Comparative example 11 |
|---|---|---|---|---|---|---|---|---|---|---|
| <A-1> PBT | % | 27 | 27 | 27 | 27 | 27 | 27 | 27 | 27 | 27 |
| <B-2> AS | " | 8 | 8 | 8 | 8 | 8 | 8 | — | — | — |
| <C-1> Phosphoric acid ester | " | 12 | 12 | 10 | 10 | 12 | 12 | 12 | 12 | 12 |
| <D-1> MC salt | " | 18 | 18 | 18 | 13 | 18 | 18 | 18 | 18 | 18 |
| <E-2> Calcium carbonate | " | 3 | 4 | 2 | 2.9 | 6 | 10 | 3 | 3 | 3 |
| <G-1> GF | " | 32 | 31 | 35 | 34.5 | 29 | 25 | 32 | 32 | 32 |
| PC | " | — | — | — | — | — | — | 8 | — | — |
| PPE | " | — | — | — | — | — | — | — | 8 | — |
| PPS | " | — | — | — | — | — | — | — | — | 8 |
| Compounding ratio between phosphoric acid ester and alkaline earth metal | | Within the range of expression (5) | Outside the range of expression (5) | Within the range of expression (5) | Outside the range of expression (5) | Outside the range of expression (5) | Outside the range of expression (5) | — | — | — |
| Property | Unit | | | | | | | | | |
| Flame retardancy (about 0.8 mm thick) | Rank | V-0 | V-0 | V-0 | V-0 | V-0 | V-0 | V-0 | V-0 | V-0 |
| Tensile strength | MPa | 124 | 116 | 104 | 118 | 116 | 104 | 118 | 113 | 108 |
| Hydrolysis resistance (tensile strength retention rate) | % | 48 | 33 | 47 | 34 | 21 | 8 | 14 | 25 | 21 |
| Tracking resistance | V | 650 | 575 | 650 | 600 | 575 | 650 | 450 | 375 | 375 |
| Metal pollution characteristic | Rank | 0 | 0 | 0 | 0 | 1 | 3 | 3 | 3 | 3 |

TABLE 4

| Composition | Compounding amount | Example 21 | Example 22 | Comparative example 12 | Comparative example 13 | Example 23 | Example 24 | Comparative example 14 | Example 25 | Comparative example 15 |
|---|---|---|---|---|---|---|---|---|---|---|
| <A-1> PBT | % | 27 | 27 | 35 | 27 | 21 | 6 | — | 59 | 74 |
| <A-2> PET | " | — | — | — | — | 6 | 21 | 27 | — | — |
| <B-2> AS | " | 8 | 8 | — | 8 | 8 | 8 | 8 | 5 | 8 |
| <C-2> Phosphoric acid ester | " | 12 | 12 | 12 | 12 | 12 | 12 | 12 | 13 | 7 |
| <D-1> MC salt | " | 18 | 18 | 18 | 18 | 18 | 18 | 18 | 22 | 10 |
| <E-2> Calcium carbonate | " | 0.5 | 0.5 | — | — | 0.5 | 0.5 | 0.5 | 0.5 | 0.5 |
| <F-1> Monofunctional glycidyl ester | " | 0.5 | — | 0.5 | 0.5 | — | — | — | — | — |
| <F-2> Mixture of monofunctional glycidyl ester and diglycidyl ether | " | — | 0.5 | — | — | — | — | — | — | — |
| <G-1> GF | " | 34 | 34 | 34.5 | 34.5 | 34.5 | 34.5 | 34.5 | — | — |
| <F-1> Teflon | " | — | — | — | — | — | — | — | 0.5 | 0.5 |
| Circumstances during injection molding | | — | — | — | — | — | — | Formed article not obtained | — | — |
| Property | Unit | | | | | | | | | |
| Flame retardancy (about 0.8 mm thick) | Rank | V-0 | V-0 | V-0 | V-0 | V-0 | V-0 | | V-1 | Non-standard |
| Tensile strength | MPa | 128 | 128 | 120 | 123 | 124 | 121 | | 61 | 63 |
| Hydrolysis resistance (tensile strength retention rate) | % | 81 | 78 | 26 | 38 | 52 | 50 | | 56 | 59 |
| Tracking resistance | V | 650 | 625 | 375 | 600 | 700 | 750 | | 600 | 350 |
| Metal pollution characteristic | Rank | 0 | 0 | 10 | 5 | 0 | 0 | | 0 | 0 |

TABLE 5

| Composition | Compounding amount | Example 2 | Example 11 | Example 26 | Example 27 | Example 28 | Example 29 | Example 30 | Example 31 | Example 32 |
|---|---|---|---|---|---|---|---|---|---|---|
| <A-1> PBT | % | 27 | 27 | 26 | 26 | 26 | 26 | 26 | 27 | 27 |
| <B-2> AS | " | 8 | — | 8 | 8 | 8 | 8 | 8 | 8 | 8 |
| <B-11> Multilayer structure | " | — | 8 | — | — | — | — | — | — | — |
| <C-1> Phosphoric acid ester | " | 12 | 12 | 12 | 12 | 12 | 12 | 12 | 12 | 12 |
| <D-1> MC salt | " | 18 | 18 | 18 | 18 | 18 | 18 | 18 | 18 | 18 |
| <E-2> Calcium carbonate | " | 0.5 | 0.5 | 0.5 | 0.5 | 0.5 | 0.5 | 0.5 | 0.5 | 0.5 |
| <G-1> GF | " | 34.5 | 34.5 | 33.5 | 33.5 | 33.5 | 33.5 | 33.5 | 34.3 | 34.3 |
| <I-1> Silicone | " | — | — | 2 | — | — | — | — | — | — |
| <I-2> Phenol resin | " | — | — | — | 2 | — | — | — | — | — |
| <I-3> Phosphonitrile compound | " | — | — | — | — | 2 | — | — | — | — |
| <J-1> Ethylene copolymer | " | — | — | — | — | — | 2 | — | — | — |
| <K-1> Phenoxy resin | " | — | — | — | — | — | — | 2 | — | — |
| <L-1> Hindered phenol antioxidant | " | — | — | — | — | — | — | — | 0.2 | 0.1 |
| <L-2> Phosphite antioxidant | " | — | — | — | — | — | — | — | — | 0.1 |
| Property | Unit | | | | | | | | | |

TABLE 5-continued

| Composition | Compounding amount | Example 2 | Example 11 | Example 26 | Example 27 | Example 28 | Example 29 | Example 30 | Example 31 | Example 32 |
|---|---|---|---|---|---|---|---|---|---|---|
| Flame retardancy (about 0.8 mm thick) | Rank | V-0 | V-0 | V-0 | V-0 | V-0 | V-1 | V-0 | V-0 | V-0 |
| Flame retardancy (about 0.4 mm thick) | " | Non-standard | Non-standard | V-1 | V-1 | V-1 | Non-standard | V-1 | Non-standard | Non-standard |
| Tensile strength | MPa | 131 | 123 | 123 | 121 | 122 | 120 | 122 | 132 | 130 |
| Hydrolysis resistance (tensile strength retention rate) | % | 58 | 51 | 51 | 50 | 52 | 50 | 63 | 58 | 56 |
| Tracking resistance | V | 650 | 600 | 625 | 575 | 625 | 700 | 625 | 650 | 650 |
| Metal pollution characteristic | Rank | 0 | 0 | 0 | 0 | 0 | 0 | 0 | 0 | 0 |
| Izod impact | J/m | 85 | 115 | — | — | — | 104 | — | — | — |
| Heat resistance (tensile strength retention rate) | % | 42 | 41 | — | — | — | — | — | 61 | 65 |

The cases of Comparative Example 1–Comparative Example 3 in Table 2 where neither one of the (B) vinyl resin and the (E) alkaline earth metal compound was compounded or one of them was not compounded were inferior in hydrolysis resistance and metal pollution. Comparative Example 1 and Comparative Example 3 where the (B) vinyl resin was not compounded were also inferior in tracking resistance. From this, it has become apparent that compositions made up of the (A) PBT, the (C) phosphoric acid ester and the (D) MC salt are compositions having challenges in hydrolysis resistance, metal pollution and tracking resistance.

Table 1 indicates effects of the compositions made up of components of the (A) PBT, the (B) vinyl resin, the (C) phosphoric acid ester, the (D) MC salt, and the (E) alkaline earth metal compound regarding flame retardancy, hydrolyzability, tracking resistance and metal pollution characteristic.

From Example 1–Example 13 in Table 1, it can be said that the compositions are excellent in flame retardancy, hydrolyzability, tracking resistance and metal pollution characteristic while maintaining high degree of flame retardancy, and solve the challenges of Comparative Example 1–Comparative Example 3, and therefore have great effects. Of Example 1–Example 9, Example 2–Example 4 where an AS containing acrylonitrile at 50 wt. % or less and 10 wt. % or greater was compounded as the (B) vinyl resin were particularly excellent in hydrolysis resistance and metal pollution characteristic. Among them, Example 4 where the epoxy-modified AS was compounded was particularly excellent in hydrolysis resistance.

Furthermore, from Example 10–Example 12, similar effects were seen in the multilayer structures having the (B) vinyl resin in the shell layer of an outer layer. Among them, Example 11 having an AS in the shell layer of an outer layer was particularly excellent in hydrolysis resistance and metal pollution characteristic.

Table 2 indicates the compounding amounts of the (B) vinyl resin, the (C) phosphoric acid ester and the (D) MC salt, and effects regarding flame retardancy, hydrolysis resistance, tracking resistance and metal pollution characteristic.

From Example 14 and Comparative Example 4, in the cases of a compounding amount of the (B) vinyl resin exceeding 20%, the flame retardancy and the hydrolysis resistance greatly deteriorated.

From Example 15 and Comparative Example 5, in the cases of a compounding amount of the (C) phosphoric acid ester exceeding 20%, the hydrolysis resistance and the metal pollution characteristic greatly deteriorated.

From Example 16 and Comparative Example 6, the cases of a compounding amount of the (D) MC salt exceeding 30% were inferior in the fluidity during injection molding, so that a formed article of predetermined dimensions could not be obtained.

Table 3 indicates effects regarding flame retardancy, hydrolysis resistance, tracking resistance, and metal pollution characteristic, in relation to the compounding amount of the (E) alkaline earth metal compound, and the compounding ratio of the (C) phosphoric acid ester and the (E) alkaline earth metal compound. Table 3 also indicates effects regarding flame retardancy, hydrolysis resistance, tracking resistance, and metal pollution characteristic in the cases where PC, PPO or PPS was compounded in place of the (B) vinyl resin.

From Example 17–Example 18 and Comparative Example 7–Comparative Example 8, the compositions in which more than 5% of the (E) alkaline earth metal compound was compounded had great deteriorations in hydrolyzability and metal pollution characteristic. Furthermore, from Example 17–Example 20 and Comparative Example 7–Comparative Example 8, the compositions in which the compounding ratio of the (C) phosphoric acid ester and the (E) alkaline earth metal compound was within the range of the expression (5) exhibited more preferable hydrolyzability and metal pollution characteristic.

Calcium carbonate, etc., that is, an alkaline earth metal compound compounded, is generally compounded in plastics as an inorganic filler in some cases for improving dimension stability, etc. However, the compounding amount thereof in such cases is greater than 5%, and is ordinarily 10–30% in many cases in order to bring about the effect as an ordinary filler. That is, the amount thereof compounded as a general inorganic filler does not have effects of the compositions herein. By compounding calcium carbonate in a compounding amount of 5% or less, and preferably within the range of the expression (5), the hydrolyzability and metal pollution characteristic effects are realized.

Furthermore, from Comparative Example 9–Comparative Example 11, the compositions in which PC, PPE or PPS was compounded in replace of the (B) vinyl resin were compositions excellent in flame retardancy but inferior in hydrolyzability, tracking resistance and metal pollution characteristic. Therefore, it can be said that by compounding the (B) vinyl resin, the desired effects can be obtained.

Table 4 indicates the effect of the epoxy compound of (F), the effect of the case where a mixture of PBT and PET was used as the (A) component, and the effects regarding flame retardancy, hydrolysis resistance, tracking resistance and metal pollution characteristic with respect to the compounding amount of the (A) component and the compositions of non-reinforced resin without glass fiber compounded.

From comparison of Example 21 and Example 22 with Example 2, the hydrolysis resistance was improved to a large extent by compounding the epoxy compound of (F) in the present invention composition. From Comparative Example 12 and Comparative Example 13, the cases where the (B) vinyl based resin and the (E) alkaline earth metal compound, or the (E) alkaline earth metal compound was not compounded resulted in compositions that were inferior in metal pollution characteristic besides having a reduced effect regarding hydrolysis resistance.

From Example 23–Example 24, it can be said that, also in the cases where a mixture of PBT and PET was used, compositions excellent in flame retardancy, hydrolysis resistance, tracking resistance and metal pollution characteristic can be obtained. Particularly, compared with the composition of Example 2 without the PET mixed, the cases employing the (A) mixture of PBT and PET obtained a tracking resistance exceeding 700V, and therefore the cases employing the (A) mixture of PBT and PET can be said to have an effect of further improving the tracking resistance.

However, in Comparative Example 14 employing only PET without any PBT mixed, the solidifying rate in the mold during injection molding was slow, and a formed article of predetermined dimensions was not obtained.

From comparison of Example 25 and Comparative Example 15, it can be said that even with a non-reinforced resin without glass fiber compounded, a composition excellent in flame retardancy, hydrolysis resistance, tracking resistance and metal pollution characteristic can be obtained. However, from Comparative Example 15, if the amount of the (A) component exceeds 70%, the flame retardancy cannot be obtained.

Table 5 indicates the effects of flame retarding assistants, an ethylene (co)polymer, a hydrolysis resistance-improving agent and antioxidant.

From Example 26–Example 28, the compositions in which a flame retarding assistant of a silicone, a phenol resin or a phosphonitrile compound was further compounded exhibited high degrees of flame retardancy while maintaining other properties even in their test pieces of about 0.4 mm in thickness.

From comparison of Example 29 with Example 2, the composition in which an ethylene (co)polymer was further compounded exhibited a high impact strength while maintaining other properties although the flame retardancy slightly deteriorated. The composition of Example 11 in which a multilayer structure was further compounded as a (B) component exhibited an even higher impact strength, and it can be said that the compounding of a multilayer structure has an effect on improvement in impact strength.

In Example 30, a phenoxy resin was compounded as a hydrolysis resistance-improving agent, and an effect on the hydrolysis resistance was seen. However, the effect thereof is inferior, in comparison with the epoxy compound of Example 21. Still, as a high degree of flame retardancy was obtained, it can be said to have a flame retarding assistant effect.

From comparison of Example 31–Example 32 with Example 2, the compositions in which an antioxidant was further compounded exhibited high heat resistances while maintaining other properties, and a more preferable result was obtained in the case where the hindered phenol antioxidant and the phosphite antioxidant were both employed.

INDUSTRIAL APPLICABILITY

The formed article made of the flame-retardant polybutylene terephthalate resin composition employs a non-halogenated flame retardant considered to have less influence on the environment, and has safety from the electrical burning inside instruments, and high degree of flame retardancy against the burning of the formed article itself, so that it is useful for electrical/electronic component parts, machine mechanism component parts, and automotive component parts. Specifically, breakers, electromagnetic switches, focus cases, flyback transformer, formed articles for fusers of printers and copiers, general household electrical appliances, housings of OA machines, etc., coil bobbins, connectors, relays, disc drive chassis, transformers, switch component parts, convenience outlet component parts, electric motor component parts, sockets, plugs, capacitors, various cases, etc., resistors, electrical/electronic component parts in which metallic terminals or leads are incorporated, computer-related component parts, acoustic component parts, audio component parts such as laser discs, illumination component parts, telegraph/telephone instrument-related component parts, airconditioner component parts, component parts of home appliances, such as VTRs, televisions, etc., component parts for copiers, component parts for facsimiles, component parts for optical instruments, automotive ignition device component parts, connectors for motor vehicles, and various electrical equipment component parts for motor vehicles, etc. may be cited.

Since highly reliable formed articles having excellent performances particularly with respect to flame retardancy, hydrolyzability and metal pollution are obtained, the compositions are especially useful for electrical/electronic component parts, such as relays, breakers, electromagnetic switches, focus cases, flyback transformers, formed articles for fusers of copiers and printers, etc.

Furthermore, with regard to formed articles used in high voltage modification or component parts that receives high voltage, a tracking phenomenon in which carbonization progresses and results in ignition is apprehended. However, since formed articles having a performance of 400V or greater in relative tracking index are obtained, the articles are especially useful as breakers, electromagnetic switches, and formed articles for fusers of printers and copiers mentioned above.

The invention claimed is:

1. A flame-retardant polybutylene terephthalate resin composition wherein (A) 20–70% by weight of a polybutylene terephthalate resin or a mixture of a polybutylene terephthalate resin and a polyethylene terephthalate resin, (B) 1–20% by weight of an acrylonitrile/styrene copolymer containing acrylonitrile at 10 wt % or greater and less than 50 wt %, (C) 1–20% by weight of a phosphoric acid ester, (D) 1–30% by weight of a salt of a triazine based compound and cyanuric acid or isocyanuric acid, and (E) 0.1–5% by weight of magnesium hydroxide and/or calcium carbonate.

2. A flame-retardant polybutylene terephthalate resin composition according to claim 1, wherein the polybutylene tereplithalate resin constituting the mixture of the polybutylene tereplithalate resin and the polyethylene terephthalate resin is at 5–95% by weight, and the polyethylene terephthalate resin is at 95–5% by weight.

3. A flame-retardant polybutylene terephthalate resin composition according to claim 1, wherein (F) 0.05–5% by weight of an epoxy compound is compounded.

4. A flame-retardant polybutylene terephthalate resin composition according to claim 3, wherein the (F) epoxy compound is an epoxy compound including a glycidyl ether compound and/or a glycidyl ester compound having an epoxy equivalent of 500 or less.

5. A flame-retardant polybutylene terephthalate resin composition according to claim 3, wherein the (F) epoxy compound is an epoxy compound including a monofunctional glycidyl ester compound having an epoxy equivalent of 500 or less.

6. A flame-retardant polybutylene terephthalate resin composition according to claim 1, wherein the (C) phosphoric acid ester is an aromatic phosphoric acid ester represented by the following (1) expression:

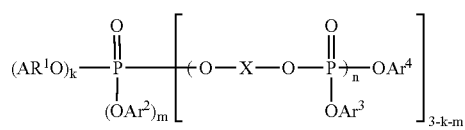

(1)

wherein Ar$^1$, Ar$^2$, Ar$^3$ and Ar$^4$ represent the same or different aromatic groups that do not contain a halogen; X represents a structure selected from expressions (2)–(4):

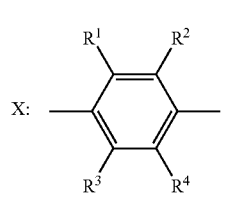

(2)

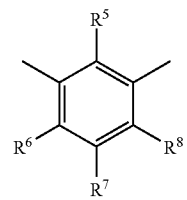

(3)

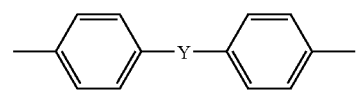

(4)

wherein R$^1$ to R$^8$ represent the same or different hydrogen atoms or alkyl groups having carbon numbers of 1–5, Y represents a direct coupling, O, S, SO$_2$, C(CH$_3$)$_2$, CH$_2$, CHPh, and Ph represents a phenyl group; n in the (1) expression represents the degree of polymerization, and is an integer of 0 or greater, k, m in the (1) expression are each an integer of 0 or greater and 2 or less, and (k+m) is an integer of 0 or greater and 2 or less.

7. A flame-retardant polybutylene terephthalate resin composition according to claim 1, wherein the (B) acrylonitrile/styrene copolymer is copolymerized with a glycidyl methacrylate.

8. A flame-retardant polybutylene terephthalate resin composition according to claim 1, wherein the (B) acrylonitrile/styrene is a multilayer structure that constitutes an outer layer (shell layer) of a multilayer structure made up of an innermost layer (core layer) and the outer layer (shell layer) covering the innermost layer.

9. A flame-retardant polybutylene terephthalate resin composition according to claim 1, wherein the compounding ratio of the (C) phosphoric acid ester and the (E) magnesium hydroxide and/or calcium carbonate is within a range of the following expression (5):

$$\frac{Wp}{M} \times Np \times 0.03 \leq \frac{Wa}{Ma} \times 2 \leq \frac{Wp}{M} \times Np \times 0.6 \quad (5)$$

wherein W$_p$ is the compounding amount (% by weight) of the (C) phosphoric acid ester, and M is the molecular weight of the (C) phosphoric acid ester, and N$_p$ is the number of phosphoric acid ester linkages of the (C) phosphoric acid ester, and Wa is the compounding amount (% by weight) of the (E) magnesium hydroxide and/or calcium carbonate, and Ma is the molecular weight of the (E) magnesium hydroxide and/or calcium carbonate.

10. A flame-retardant polybutylene terephthalate resin composition according to claim 1, having a relative tracking index of 400V or greater.

11. A formed article formed from a flame-retardant polybutylene terephthalate resin composition according to claim 1, wherein the article is a machine mechanism component part, an electrical/electronic component part, or an automotive component part.

12. A formed article formed from a flame-retardant polybutylene terephthalate resin composition according to claim 1, wherein the article is a breaker, an electromagnetic switch, a focus case, a flyback transformer, or a fuser of a copier or a printer.

* * * * *

UNITED STATES PATENT AND TRADEMARK OFFICE
CERTIFICATE OF CORRECTION

PATENT NO. : 7,135,509 B2  Page 1 of 1
APPLICATION NO. : 10/528632
DATED : November 14, 2006
INVENTOR(S) : Ishii et al.

It is certified that error appears in the above-identified patent and that said Letters Patent is hereby corrected as shown below:

<u>In Column 35</u>

At line 43 and 44, please change "flame retardancy, hydrolyzability" to --hydrolysis resistance--; and at line 48, please change "hydrolyzability" to --hydrolysis resistance--.

Signed and Sealed this

Tenth Day of July, 2007

JON W. DUDAS
*Director of the United States Patent and Trademark Office*